(12) United States Patent
Vavintaparthi et al.

(10) Patent No.: US 12,094,141 B2
(45) Date of Patent: Sep. 17, 2024

(54) BANDWIDTH EFFICIENT IMAGE PROCESSING

(71) Applicant: QUALCOMM Incorporated, San Diego, CA (US)

(72) Inventors: Nageswara Rao Vavintaparthi, Bangalore (IN); Venkatesh Hanamsagar, Bangalore (IN); Joby Abraham, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/686,355

(22) Filed: Mar. 3, 2022

(65) Prior Publication Data

US 2023/0281848 A1 Sep. 7, 2023

(51) Int. Cl.
*G06T 3/40* (2024.01)
*G06T 7/55* (2017.01)

(52) U.S. Cl.
CPC .............. *G06T 7/55* (2017.01); *G06T 3/40* (2013.01); *G06T 2207/10016* (2013.01)

(58) Field of Classification Search
None
See application file for complete search history.

(56) References Cited

U.S. PATENT DOCUMENTS

2011/0222605 A1* 9/2011 Kashiwagi ........... H04N 19/187
375/E7.076
2011/0274177 A1* 11/2011 Park ..................... H04N 19/91
375/E7.076
2012/0314026 A1* 12/2012 Chen .................... H04N 19/172
375/E7.076

(Continued)

FOREIGN PATENT DOCUMENTS

| EP | 3883245 A1 | 9/2021 |
| WO | 2011037933 A1 | 3/2011 |
| WO | 2020228835 A1 | 11/2020 |

OTHER PUBLICATIONS

International Search Report and Written Opinion—PCT/US2023/062444—ISA/EPO—Apr. 5, 2023.

(Continued)

*Primary Examiner* — Dung D Tran
(74) *Attorney, Agent, or Firm* — Polsinelli

(57) ABSTRACT

Systems and techniques are described herein for processing frames. For example, a process can include obtaining a current frame from a sequence of frames, the current frame associated with a first bit depth resolution and a reference frame preceding the current frame associated with the first bit depth and resolution. The process can include determining a difference between a first pixel value of the current frame and a second pixel value of the reference frame, the first pixel value and the second pixel value associated with a corresponding first pixel position. The process can include outputting a first portion of the determined difference as a first output value and, based on a determination that the determined difference does not exceed a maximum magnitude of a second bit depth, outputting an indication that the determined difference does not include a second portion associated with the first pixel position.

30 Claims, 12 Drawing Sheets

(56) References Cited

U.S. PATENT DOCUMENTS

2012/0314965 A1\* 12/2012 Kashiwagi ............. H04N 19/30
382/232

OTHER PUBLICATIONS

Winken M., et al., "Bit-Depth Scalable Video Coding", Image Processing, 2007, ICIP 2007, IEEE International Conference on, IEEE, PI, Sep. 1, 2007 (Sep. 1, 2007), 4 pages, XP031157664, ISBN: 978-1-4244-1436-9, abstract, Section 2. Description of the approach figure 1, paragraph [0002]-paragraph [0003] figure 1.

\* cited by examiner

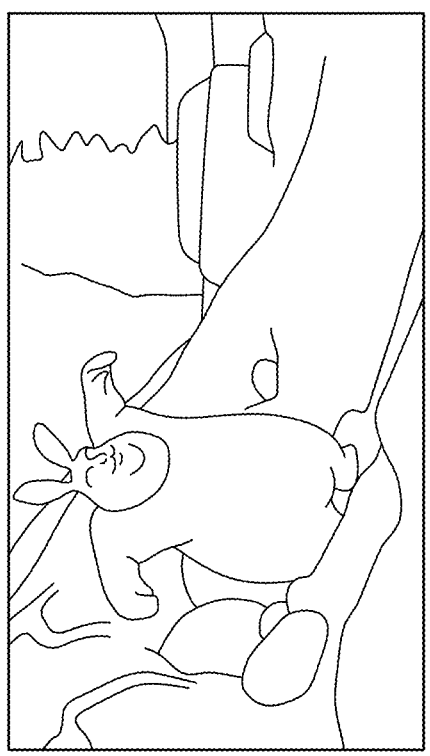
FIG. 4A
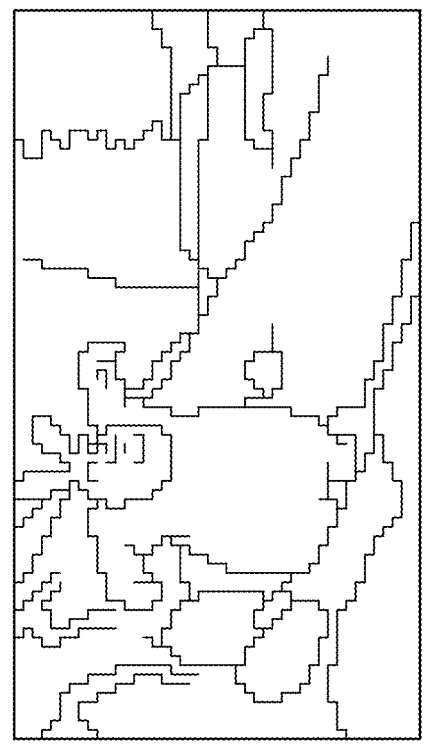
FIG. 4B
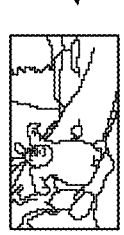
FIG. 4C
FIG. 4D

BANDWIDTH EFFICIENT IMAGE PROCESSING

FIELD

This application is related to video frame processing. More specifically, aspects of the application relate to systems and techniques of reducing memory bandwidth requirements for storing video frames.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses. Digital video data includes large amounts of data to meet increasing demands in video quality, performance, and features. For example, consumers of video data typically desire high quality videos, with high fidelity, resolutions, frame rates, and the like.

The large amounts of video data often needed to meet these demands places a significant burden on communication networks and devices that process and store the video data. Various techniques can be used to lower the bandwidth needed to process and/or store video data. With increasing availability of video capture devices and the increasing demands for storing and processing large amounts of video data, techniques for reducing bandwidth required to store and process video data are needed.

SUMMARY

Disclosed are systems, apparatuses, methods, and computer-readable media for bandwidth efficient processing of frames. According to at least one example, a method is provided for processing frames. The method includes: obtaining a current frame from a sequence of frames, the current frame associated with a first bit depth and a first resolution; obtaining a reference frame associated with the first bit depth and the first resolution, the reference frame preceding the current frame in the sequence of frames; determining a difference between a first pixel value of the current frame and a second pixel value of the reference frame, the first pixel value and the second pixel value associated with a corresponding first pixel position in the current frame and the reference frame; outputting a first portion of the determined difference as a first output value associated with the first pixel position; based on a determination that the determined difference between the first pixel value and the second pixel value does not exceed a maximum magnitude of a second bit depth, outputting an indication that the determined difference does not include a second portion associated with the first pixel position, wherein the second bit depth is less than the first bit depth.

In another example, an apparatus for processing frames is provided that includes a memory (e.g., configured to store data, such as virtual content data, one or more images, etc.) and one or more processors (e.g., implemented in circuitry) coupled to the memory. The one or more processors are configured to and can: obtain a current frame from a sequence of frames, the current frame associated with a first bit depth and a first resolution; obtain a reference frame associated with the first bit depth and the first resolution, the reference frame preceding the current frame in the sequence of frames; determine a difference between a first pixel value of the current frame and a second pixel value of the reference frame, the first pixel value and the second pixel value associated with a corresponding first pixel position in the current frame and the reference frame; output a first portion of the determined difference as a first output value associated with the first pixel position; based on a determination that the determined difference between the first pixel value and the second pixel value does not exceed a maximum magnitude of a second bit depth, output an indication that the determined difference does not include a second portion associated with the first pixel position, wherein the second bit depth is less than the first bit depth.

In another example, a non-transitory computer-readable medium is provided that has stored thereon instructions that, when executed by one or more processors, cause the one or more processors to: obtain a current frame from a sequence of frames, the current frame associated with a first bit depth and a first resolution; obtain a reference frame associated with the first bit depth and the first resolution, the reference frame preceding the current frame in the sequence of frames; determine a difference between a first pixel value of the current frame and a second pixel value of the reference frame, the first pixel value and the second pixel value associated with a corresponding first pixel position in the current frame and the reference frame; output a first portion of the determined difference as a first output value associated with the first pixel position; based on a determination that the determined difference between the first pixel value and the second pixel value does not exceed a maximum magnitude of a second bit depth, outputting an indication that the determined difference does not include a second portion associated with the first pixel position, wherein the second bit depth is less than the first bit depth.

In another example, an apparatus for processing frames is provided. The apparatus includes: means for obtaining a current frame from a sequence of frames, the current frame associated with a first bit depth and a first resolution; means for obtaining a reference frame associated with the first bit depth and the first resolution, the reference frame preceding the current frame in the sequence of frames; means for determining a difference between a first pixel value of the current frame and a second pixel value of the reference frame, the first pixel value and the second pixel value associated with a corresponding first pixel position in the current frame and the reference frame; means for outputting a first portion of the determined difference as a first output value associated with the first pixel position; based on a determination that the determined difference between the first pixel value and the second pixel value does not exceed a maximum magnitude of a second bit depth, output an indication that the determined difference does not include a second portion associated with the first pixel position, wherein the second bit depth is less than the first bit depth.

In some aspects, the first portion of the determined difference comprises a number of least significant bits of the determined difference.

In some aspects, the number of least significant bits of the determined difference is equal to the second bit depth.

In some aspects, the method, apparatuses, and non-transitory computer readable medium described above further comprise: determining a difference between a third pixel value of the current frame and a fourth pixel value of the reference frame, wherein the third pixel value and the fourth pixel value are associated with a corresponding second pixel position in the current frame and the reference frame; outputting a first portion of the determined difference between the third pixel value and the second pixel value as a second output value associated with the second bit depth, the second output value associated with the second pixel position; based on determining that the difference between the third pixel value and the fourth pixel value exceeds the maximum magnitude of the second bit depth; outputting an indication that the determined difference includes a second portion associated with the second pixel position and a third bit depth; outputting the second portion associated with the second pixel position as a third output value, wherein the third output value corresponds to a remaining portion of the determined difference between the third pixel value and the fourth pixel value not included in the second output value.

In some aspects, the third bit depth is a function of the first bit depth and the second bit depth.

In some aspects, the third bit depth is equal to the first bit depth minus the second bit depth.

In some aspects, the first output value associated with the first pixel position corresponding to the first portion of the determined difference between the first pixel value and the second pixel value, the second output value associated the second pixel position corresponding to the first portion of the determined difference between the third pixel value and the fourth pixel value, the third output value associated with the second pixel position corresponding to the second portion of the determined difference between the third pixel value and the fourth pixel value.

In some aspects, the bandwidth efficient representation of the current frame does not include an output value associated with the first pixel position corresponding to the second portion of the determined difference between the first pixel value and the second pixel value.

In some aspects, the method, apparatuses, and non-transitory computer readable medium described above further comprise: obtaining a downscaled previous frame associated with the first bit depth and a second resolution, the second resolution being less than the first resolution in at least one dimension; upscaling the downscaled previous frame from the second resolution to the first resolution to generate the reference frame.

In some aspects, the method, apparatuses, and non-transitory computer readable medium described above further comprise: outputting a sign bit indicative of a sign of the first output value.

In some aspects, shifting the determined difference represented in binary toward a least significant bit of the determined difference by a number of bits equal to the second bit depth to generate the second portion associated with the first pixel position; shifting the second portion toward a most significant bit of the second portion by the number of bits equal to the second bit depth to generate a subtraction value; subtracting the subtraction value from the determined difference to generate the first portion of the determined difference.

In some aspects, the first portion comprises a number of least significant bits equal to the second bit depth resulting from subtracting the subtraction value from the determined difference.

Disclosed are systems, apparatuses, methods, and computer-readable media for bandwidth efficient processing of frames. According to at least one example, a method is provided for processing frames. The method includes: obtaining a bandwidth efficient representation of a target frame associated with a first resolution and a first bit depth; the bandwidth efficient representation of the target frame includes pixel data for a plurality of pixel positions of the target frame, the pixel data includes a first portion of pixel data for every pixel position of the plurality of pixel positions and a second portion of pixel data for a subset of the plurality of pixel positions, the subset of the plurality of pixel positions excludes one or more bandwidth efficient pixel positions of the plurality of pixel positions, the bandwidth efficient representation includes an indication that each pixel position of the subset of the plurality of pixel positions includes a second portion of pixel and that the one or more bandwidth efficient pixel positions do not include a second portion of pixel data, obtaining a reference frame associated with the bandwidth efficient representation of the target frame, the first resolution and the first bit depth; generating a first reconstructed pixel based on a first pixel value of the reference frame and a first portion of the bandwidth efficient representation of the target frame associated with the first pixel position, wherein the one or more bandwidth efficient pixel positions comprises the first pixel position.

In another example, an apparatus for processing frames is provided that includes a memory (e.g., configured to store data, such as virtual content data, one or more images, etc.) and one or more processors (e.g., implemented in circuitry) coupled to the memory. The one or more processors are configured to and can: obtain a bandwidth efficient representation of a target frame associated with a first resolution and a first bit depth; the bandwidth efficient representation of the target frame includes pixel data for a plurality of pixel positions of the target frame, the pixel data includes a first portion of pixel data for every pixel position of the plurality of pixel positions and a second portion of pixel data for a subset of the plurality of pixel positions, the subset of the plurality of pixel positions excludes one or more bandwidth efficient pixel positions of the plurality of pixel positions, the bandwidth efficient representation includes an indication that each pixel position of the subset of the plurality of pixel positions includes a second portion of pixel and that the one or more bandwidth efficient pixel positions do not include a second portion of pixel data, obtain a reference frame associated with the bandwidth efficient representation of the target frame, the first resolution and the first bit depth; generate a first reconstructed pixel based on a first pixel value of the reference frame and a first portion of the bandwidth efficient representation of the target frame associated with the first pixel position, wherein the one or more bandwidth efficient pixel positions comprises the first pixel position.

In another example, a non-transitory computer-readable medium is provided that has stored thereon instructions that, when executed by one or more processors, cause the one or more processors to: obtain a bandwidth efficient representation of a target frame associated with a first resolution and a first bit depth; the bandwidth efficient representation of the target frame includes pixel data for a plurality of pixel positions of the target frame, the pixel data includes a first portion of pixel data for every pixel position of the plurality of pixel positions and a second portion of pixel data for a subset of the plurality of pixel positions, the subset of the plurality of pixel positions excludes one or more bandwidth efficient pixel positions of the plurality of pixel positions, the bandwidth efficient representation includes an indication that each pixel position of the subset of the plurality of pixel positions includes a second portion of pixel and that the one or more bandwidth efficient pixel positions do not include a second portion of pixel data, obtain a reference frame associated with the bandwidth efficient representation of the target frame, the first resolution and the first bit depth; generate a first reconstructed pixel based on a first pixel value of the reference frame and a first portion of the bandwidth efficient representation of the target frame associated with the first pixel position, wherein the one or more bandwidth efficient pixel positions comprises the first pixel position.

In another example, an apparatus for processing frames is provided. The apparatus includes: means for obtaining a bandwidth efficient representation of a target frame associated with a first resolution and a first bit depth; the bandwidth efficient representation of the target frame includes pixel data for a plurality of pixel positions of the target frame, the pixel data includes a first portion of pixel data for every pixel position of the plurality of pixel positions and a second portion of pixel data for a subset of the plurality of pixel positions, the subset of the plurality of pixel positions excludes one or more bandwidth efficient pixel positions of the plurality of pixel positions, the bandwidth efficient representation includes an indication that each pixel position of the subset of the plurality of pixel positions includes a second portion of pixel and that the one or more bandwidth efficient pixel positions do not include a second portion of pixel data, means for obtaining a reference frame associated with the bandwidth efficient representation of the target frame, the first resolution and the first bit depth; means for generating a first reconstructed pixel based on a first pixel value of the reference frame and a first portion of the bandwidth efficient representation of the target frame associated with the first pixel position, wherein the one or more bandwidth efficient pixel positions comprises the first pixel position.

In some aspects, the method, apparatuses, and non-transitory computer readable medium described above further comprise: generating a second reconstructed pixel based on combining a second pixel value of the reference frame and a first pixel portion of the bandwidth efficient representation of the target frame, the first pixel value of the reference frame and the first pixel value of the bandwidth efficient representation of the target frame associated with a first pixel position of the plurality of pixel positions in the reference frame and the bandwidth efficient representation of the target frame, respectively, wherein the one or more bandwidth efficient pixel positions comprises the first pixel position.

In some aspects, obtaining the reference frame associated with the bandwidth efficient representation of the target frame, the first resolution and the first bit depth comprises obtaining a downscaled reference frame associated with the target frame, the first bit depth, and a second resolution different less than the first resolution and upscaling the downscaled reference frame from the second resolution to the first resolution to generate the reference frame.

In some aspects, the reference frame precedes the target frame in a sequence of frames.

In some aspects, the apparatus comprises a camera, a mobile device (e.g., a mobile telephone or so-called "smart phone" or other mobile device), a wireless communication device, a wearable device, an extended reality (XR) device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIGS. 4A through 4E are example frames at different stages of formatting as shown in FIGS. 3A and 3B and/or reconstruction as shown in FIGS. 5A and 5B, in accordance with some examples;

DETAILED DESCRIPTION

Figure 1:
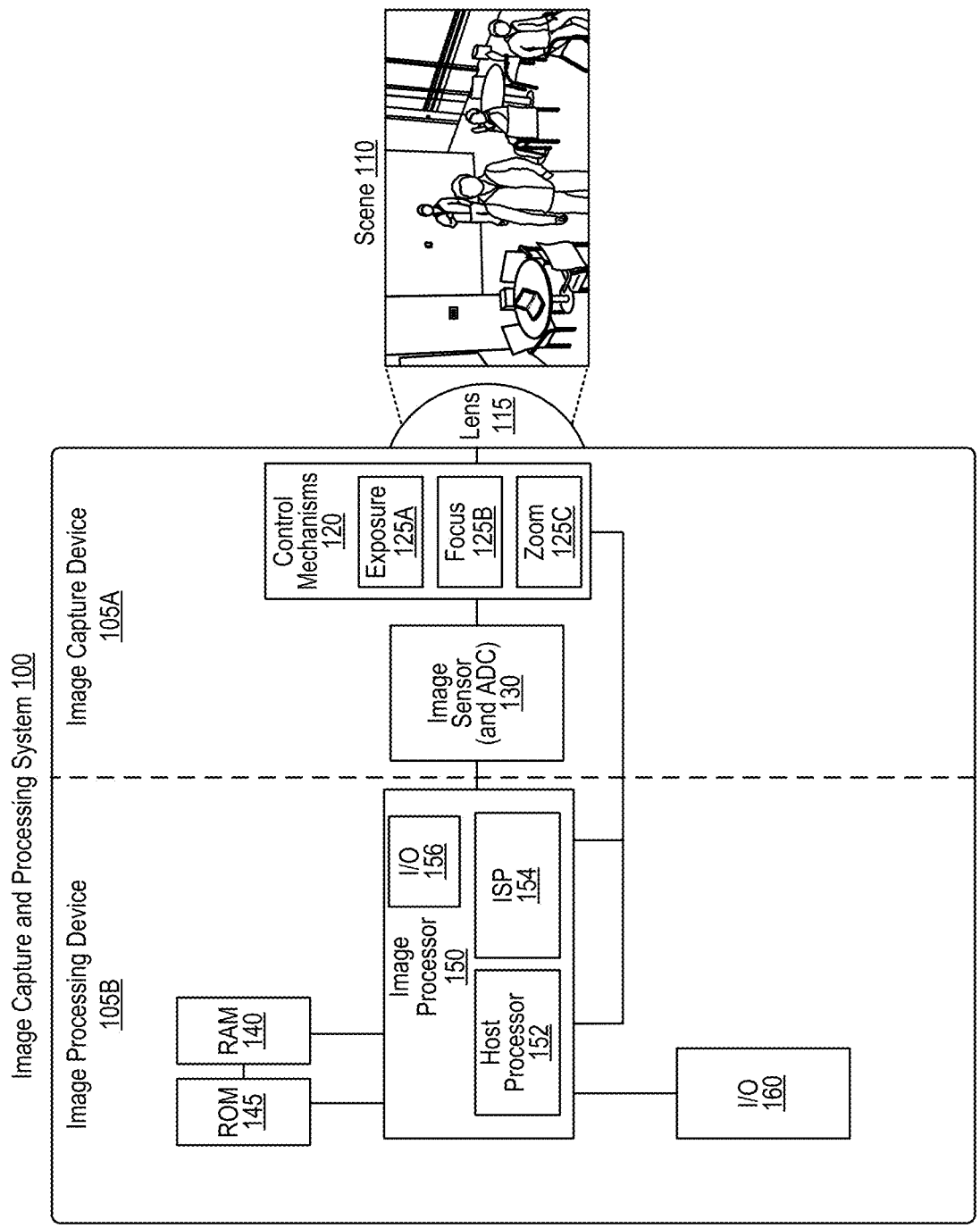
FIG. 1 is a block diagram illustrating an architecture of an image capture and processing device, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," "video frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. An image capture device can capture digital video data.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data to, for example, reduce the amount of data needed to store and transmit video data. Video coding can be performed according to a particular video coding standard. Example video coding standards include high-efficiency video coding (HEVC), advanced video coding (AVC), moving picture experts group (MPEG) coding, versatile video coding (VVC), among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. However, many video coding techniques can result in degradations in video quality and/or cannot be performed in real time as video frames are being captured by one or more image capture devices (e.g., cameras). Systems and techniques are needed for lossless and bandwidth (BW) efficient processing of video frames that can be performed in real time as image frames are captured.

As described in more detail herein, systems, apparatuses, methods (also referred to as processes), and computer-readable media (collectively referred to herein as "systems and techniques") are described herein for formatting video frames in a BW efficient format that reduces the total amount of data required to store frame data, can be performed in real time, and can be recovered without any loss. In some examples, the systems and techniques described herein are described as performing BW efficient real time video processing. However, the systems and techniques can be applied to any sequences of frames or images. In addition, the systems and techniques described herein are described in some examples as formatting video frames captured by one or more image capture devices in real time. However, the systems and techniques can be used to format and/or recover frames in a bandwidth efficient and lossless manner during any stage of processing and/or accessing the video frames. For example, one or more video frames generated during offline processing of a sequence of video frames can also be formatted in the BW efficient format and stored and later retrieved without degradation.

In some examples, a storage device (e.g., as part of a BW efficient real time video processing system) can be used to store frames in the BW efficient format. In some examples, when a frame is required for further processing, the frames in the BW efficient format can be retrieved from the storage device and reconstructed to the original video format.

In some examples, the BW efficient format includes generating a difference frame (e.g., performing a pixel-wise subtraction) between a current frame and a reference frame. In some cases, the reference frame can be a frame preceding the current frame in a sequence of frames. In some cases, the reference frame can be the frame immediately before the current frame in the sequence. In some examples, the reference frame can precede the current frame by two or more frames in the sequence of frames. In some implementations, the reference frame can follow the current frame in the sequence of frames. In some cases, a single reference frame can be used to generate a difference frame for multiple frames in the sequence of frames. For example, the reference frame can be used to generate difference frames for one or more frames preceding the reference frame, one or more frames following the reference frame, or any combination thereof. In some cases, the reference frame can be downscaled before being stored (e.g., in the storage device) and after being retrieved from storage the reference frame upscaled to the original video resolution prior to generating the difference frame. By downscaling the reference frame before storage, the overhead associated with the use of a reference frame in the BW efficient format can be mitigated. For pixel locations where the scene captured in the current frame and the reference frame has little or no change, the difference in pixel values between frames can be small and capable of being stored in a small number of bits (e.g., a number K of least significant bits).

In some cases, a frame formatting section of a BW efficient real time video processing system can format the difference frame to include the K least significant bits for every pixel location of the difference frame and additional bits (e.g., the remaining most significant bits) only for pixels with a difference larger than what can be stored in the K least significant bits. In some cases, a valid bit for each pixel location can indicate whether the difference value for each respective pixel location includes only the K least significant bits or also includes additional bits. For each difference value that can fit within only the K least significant bits, the BW efficient format can store the difference value using less data than the original bit depth of the current frame. As used herein, bit depth can refer to a number of data bits used to store data for each pixel location in a frame. For example, for a frame with a pixel bit depth equal to sixteen (16) bits and K=5, the eleven (11) most significant bits of the difference frame can be represented as a logically false (or inactive, "0", etc.) valid bit when the 11 most significant bits of the pixel value at a particular pixel position are all zeroes.

In some aspects, a frame reconstruction section can be used to recover the original frame from the BW efficient format. The frame reconstruction section can reconstruct the magnitude for each pixel of the difference frame with the K least significant bits provided for every pixel location. In some examples, if the valid bit is logically true (or active, "1" value, etc.), the frame reconstruction section can retrieve the additional bits stored in memory and use the additional bits as the most significant bits of the pixel value associated with the pixel location. In some cases, if the valid bit is logically false (or inactive, "0" value, etc.) for a pixel location, then the frame reconstruction section can append all zeroes into the most significant bits of the pixel value associated with the pixel location. In some examples, once the magnitude of the pixel value is determined, the magnitude can be multiplied by the sign indicated by the sign bit to fully reconstruct the difference frame. In some examples, after the difference frame is fully reconstructed by the frame reconstruction section, the difference frame can be added to the reference frame to reconstruct the current frame without any loss. As noted above, in some cases, a downscaled version of the reference frame can be stored in memory to reduce overhead, and the downscaled version of the reference frame can be upscaled to the video resolution (e.g., a resolution matching the current frame), prior to being added to the reconstructed difference frame.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, high dynamic range (HDR), depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

In some examples, image sensor 130 can use yellow, magenta, cyan (also referred to as "emerald"), and/or other types of color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 9:
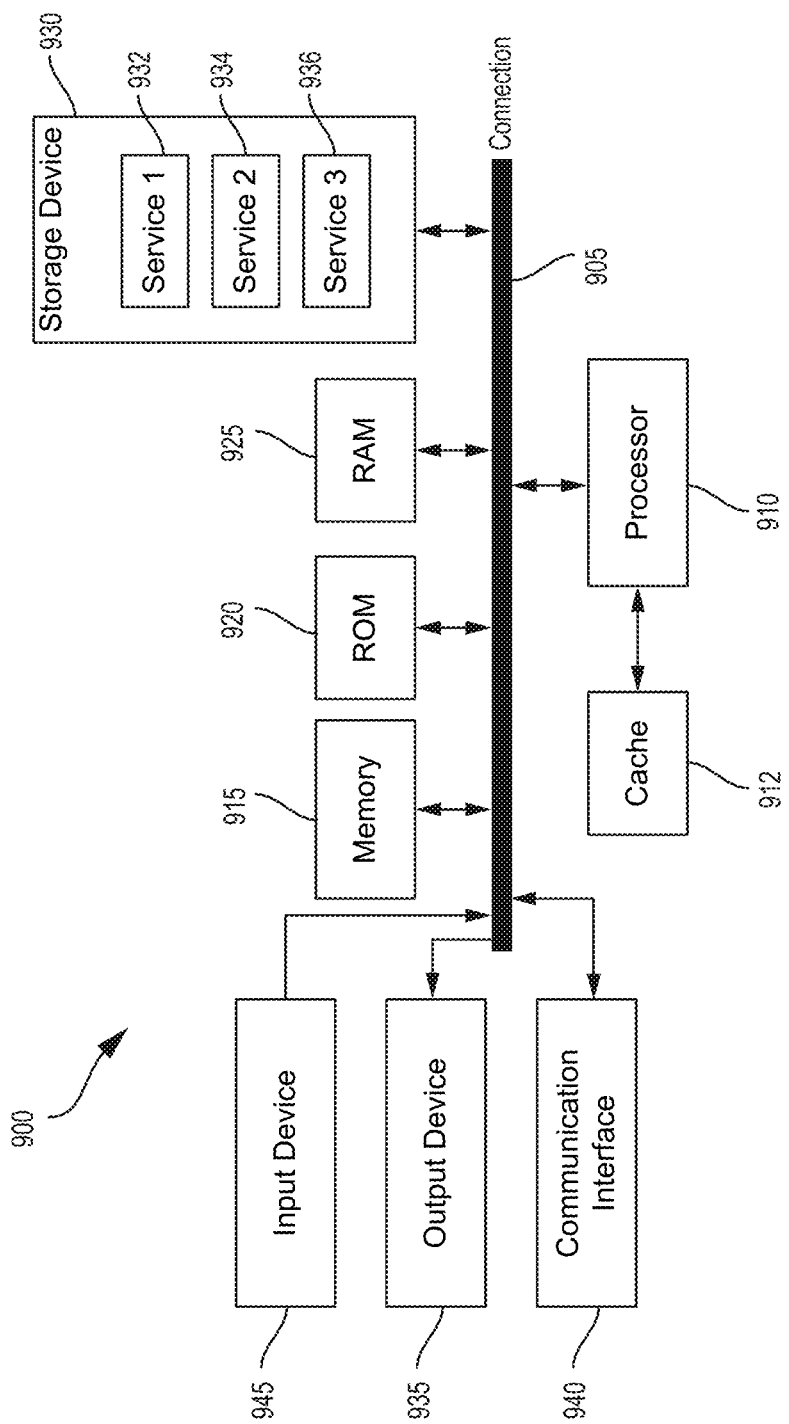
FIG. 9 is a diagram illustrating an example of a computing system for implementing certain aspects described herein.

The image processor 150 may include one or more processors, such as one or more image signal processors (ISPs) (including ISP 154), one or more host processors (including host processor 152), and/or one or more of any other type of processor 910 discussed with respect to the computing system 900 of FIG. 9. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/925, read-only memory (ROM) 145/920, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 935, any other input devices 945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

Figure 2:
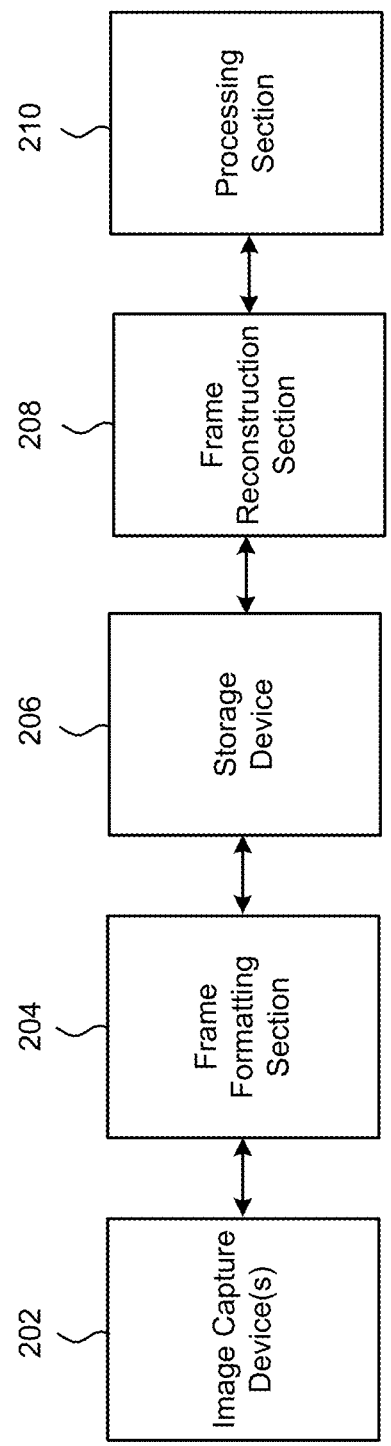
FIG. 2 is a block diagram illustrating an architecture of an example bandwidth (BW) efficient real time video processing system, in accordance with some examples.

In some examples, the BW efficient real time video processing system 200 of FIG. 2 can include and/or be included in the image capture and processing system 100, the image capture device 105A, the image processing device 105B, or a combination thereof.

FIG. 2 is a block diagram illustrating an example of a BW efficient real time video processing system 200. The BW efficient real time video processing system 200 includes various components that are used to process a sequence of frames. The sequence of frames can include, for example, an animation, a sporting event, a home video, or the like. As shown, the components of the BW efficient real time video processing system 200 include one or more image capture devices 202, a frame formatting section 204, a storage device 206, a frame reconstruction section 208, and a processing section 210.

In some cases, the BW efficient real time video processing system 200 may be a single device. In some cases, BW efficient real time video processing system 200 may be two or more separate devices and/or portions of the BW efficient real time video processing system 200 may be included in two or more devices. For example, the frame formatting section 204 may be implemented in a first device to format one or more frames in a BW efficient format. In some examples, a second device may obtain (e.g., by wired and/or wireless communication) the formatted frames in the BW efficient format from the first device. In some implementations, the second device can include a frame reconstruction section 208 that can losslessly reconstruct the one or more frames based on the formatted frames and a reference frame. In some implementations, each of the first and second device can include storage device 206, such as cache, DRAM, SRAM, or any type of storage. In some cases, the first device can store formatted frames formatted by the frame formatting section 204 in storage device 206 of the first device. In some examples, the second device can obtain formatted frames from storage device 206 of the second device for reconstruction by the frame reconstruction section 208 of the second device.

The one or more image capture devices 202 can include any image and/or video sensors or capturing devices. In some examples, the one or more image capture devices 202 can be part of a multiple-camera assembly, such as a dual-camera assembly. The one or more image capture devices 202 can capture image and/or video content (e.g., raw image and/or video data), which can then be processed by an image processor (e.g., image processing device 105B). In some examples, the one or more image capture devices 202 may include an image capture and processing system 100, an image capture device 105A, an image processing device 105B, or a combination thereof.

In some examples, the one or more image capture devices 202 can capture image data and can generate images (also referred to as frames) based on the image data and/or can provide the image data or frames to the frame formatting section 204, storage device 206, and/or processing section 210 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the one or more image capture devices 202 (and/or other camera of BW efficient real time video processing system 200) can be configured to also capture depth information. For example, in some implementations, the one or more image capture devices 202 (and/or other camera) can include an RGB-depth (RGB-D) camera. In some cases, the BW efficient real time video processing system 200 can include one or more depth sensors (not shown) that are separate from the one or more image capture devices 202 (and/or other camera) and that can capture depth information. For instance, such a depth sensor can obtain depth information independently from the one or more image capture devices 202. In some examples, a depth sensor can be physically installed in the same general location as the one or more image capture devices 202 but may operate at a different frequency or frame rate from the one or more image capture devices 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The BW efficient real time video processing system 200 can include or be part of an image capture device or system (e.g., image capture and processing system 100). In other implementations, the BW efficient real time video processing system 200 can be part of a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, an XR device (e.g., a VR headset or head-mounted display (HMD), an AR headset, HMD, or glasses, etc.), or any other suitable electronic device. In some examples, the BW efficient real time video processing system 200 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the BW efficient real time video processing system 200 (e.g., the one or more image capture devices 202, frame formatting section 204, the storage device 206, the frame reconstruction section 208, and the processing section 210) can be part of the same computing device. In some implementations, the components of the BW efficient real time video processing system 200 can be part of two or more separate computing devices. In some cases, the BW efficient real time video processing system 200 can be implemented as part of the computing system 900 shown in FIG. 9.

The storage device 206 can be any storage device(s) for storing data. Moreover, the storage device 206 can store data from any of the components of BW efficient real time video processing system 200. For example, the storage device 206 can store data from the one or more image capture devices 202 (e.g., image or video data), data from frame formatting section 204, data from frame reconstruction section 208, data from processing section 210, data from sensors such as an accelerometer (e.g., measurements), data from a gyroscope (e.g., measurements), and/or data from an image processing device (e.g., image processing device 105B).

Frame formatting section 204 can obtain frames from the one or more image capture devices 202 as input for formatting into a BW efficient format. In one illustrative example, frame formatting section 204 can obtain the most recently captured frame from the one or more image capture devices 202 (also referred to herein as the current frame or Nth frame) as an input. The frame formatting section 204 can also obtain a version of a frame preceding the current frame in a sequence of frames for use as a reference for formatting into the BW efficient format. For example, the frame formatting section 204 can obtain a downscaled version of the frame immediately preceding the current frame in the sequence of frames (also referred to herein as the previous frame or N−1th frame). In some case the frame formatting section 204 can utilize the current frame and version of the previous frame to represent the data of the current frame with a data representation (e.g., the BW efficient format) that contains less data than the current frame prior to formatting by the frame formatting section 204 (also referred to herein as the original current frame). In some cases, the current frame represented in the BW efficient format can be stored in storage device 206. In some cases, a downscaled version of the current frame can also be stored in storage device 206. In some cases, the total bandwidth required to store the current frame in the BW efficient format can be less than the bandwidth required to store the original current frame. In some cases, the frame formatting section 204 can operate on the data from one or more image capture devices 202 in real time, providing significant bandwidth savings at the beginning of a frame processing pipeline.

Figure 3A:
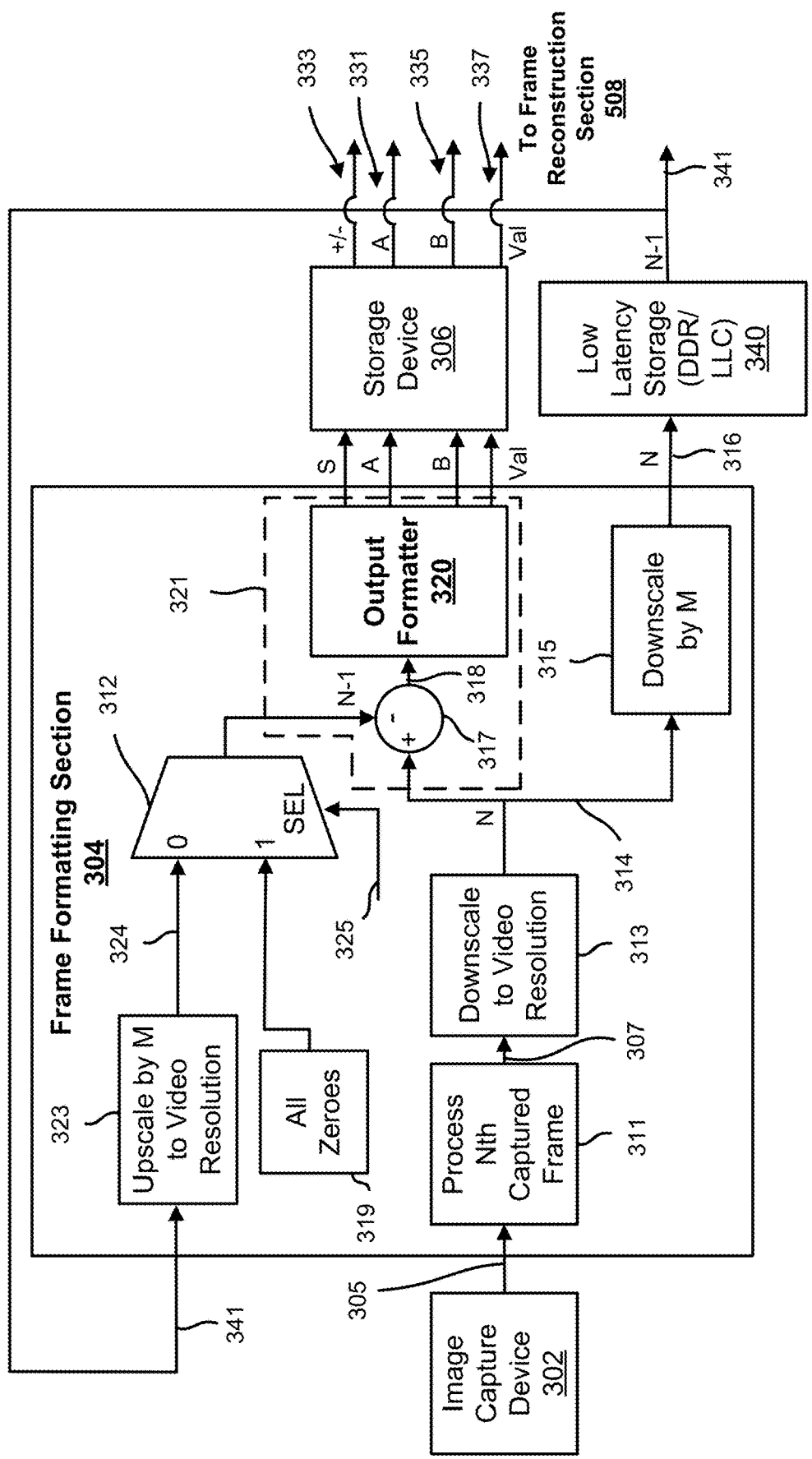
FIG. 3A is a block diagram illustrating an example frame formatting section of a BW efficient real time video processing system, in accordance with some examples.

FIG. 3A is a block diagram illustrating an architecture of a frame formatting section 304. In some cases, the frame formatting section 304 can correspond to frame formatting section 204 of BW efficient real time video processing system 200 of FIG. 2. In some cases, image capture device 302 can include a camera configured to capture color frames and/or monochrome frames. The color frames can include: red-green-blue (RGB) frames; luma, chroma-blue, chroma-red (YCbCr or Y'CbCr) frames; and/or any other suitable type of frame. In some cases, the image capture device 302 can include one or more IR cameras and one or more RGB cameras. In some examples, the frame formatting section 304 obtains a raw current frame 305 from image capture device 302. In some cases, image capture device 302 can correspond to one or more image capture devices 202 of FIG. 2.

The raw current frame 305 obtained by the frame formatting section 304 can perform image processing steps at processing block 311. The raw current frame 305 output by the image capture device 302 can include a number of bits per pixel J that can contain information (e.g., RGB color, monochrome, YCbCR information, or the like) representing a scene captured by the image capture device 302 in the raw current frame 305. In one illustrative example, the number of bits per pixel J of the raw current frame 305 can be equal to 16. In some examples, the frame formatting section 304 can perform various image processing on the raw current frame 305 steps at processing block 311, including, but not limited to, color correction, white balancing, any of the image processing tasks described with respect to image processor 150 of FIG. 1 above, or any combination thereof. After processing the raw current frame 305, the frame formatting section 304 can downscale the processed current frame 307 to a video resolution at downscaler 313. For example, the current frame can be downscaled to high definition (HD), full high definition (FHD), and ultra high definition (UHD), or any other resolution supported by the frame formatting section 304. The video resolution can correspond, for example, to a user setting of an image capture device (e.g., image capture device 105A). In the example frame formatting section 304 of FIGS. 3A and 3B, the label N indicates that some version (e.g., raw, processed, video resolution, downscaled) of the current frame is present and the label N−1 indicates that some version (e.g., downscaled, video resolution) of the previous frame, (e.g., the frame immediately preceding the current frame N in a sequence of frames) is present. The labels N and N−1 can each represent a numerical index of a frame within a sequence of frames, with reference frame N−1 being the frame immediately preceding current frame N.

After downscaling the current frame N to generate video resolution current frame 314, the video resolution current frame 314 is output to a another downscaler 315 and to an input of subtractor 317. FIG. 4A depicts an example video resolution current frame 410 that can correspond to video resolution current frame 314.

Returning to FIG. 3A, in some examples, a downscaler 315 can downscale the video resolution current frame 314 by a scaling factor M. In some cases, the scaling factor M can be indicative of a numerical correspondence (e.g., a ratio, or other relationship) between the number of pixels in the current frame at video resolution and the number of pixels in a downscaled version of the current frame after downscaling at downscaler 315. In some cases, the scaling factor M can be indicative of a numerical correspondence (e.g., a ratio or other relationship), between each dimension (e.g., a height H and a width W) of the current frame and each dimension of the downscaled current frame after downscaling. The downscaled current frame 316 can be stored in a low latency storage 340. In some cases, the low latency storage 340 can be a last level cache (LLC), a double data-rate (DDR) memory, or any other type of low latency storage. In some cases, low latency storage 340 can include and/or be included in storage device 206 of FIG. 2.

FIG. 4B depicts an example downscaled current frame 420 that can correspond to downscaled current frame 316. In the illustrated example, the downscaled current frame 420 is downscaled by a scaling factor M=4 in both the width (W) and height (H) dimensions. In the illustrated example, the downscaled current frame 420 includes one sixteenth (1/16) the number of pixels in the video resolution current frame 410.

Returning to FIG. 3A, the frame formatting section 304 can obtain a reference frame for formatting the current frame N into a BW efficient format. In some cases, the downscaled reference frame 341 for the current frame N can correspond to the downscaled version of the previous frame N−1. In some cases, the downscaled reference frame 341 is the previous frame N−1 downscaled at downscaler 315 and stored in low latency storage 340 at the time the previous frame was obtained from image capture device 302. FIG. 4C depicts an example video resolution previous frame 430 that can correspond to downscaled reference frame 341. Similarly, the downscaled current frame 316 stored in low latency storage 340 can be used as a reference frame for a subsequent frame (e.g., the next frame in the sequence of frames after the current frame, frame N+1). The downscaled reference frame 341 can be upscaled by the upscaler 323 by the scaling factor M (e.g., the inverse of the operation performed by downscaler 315). In some examples, the resulting video resolution reference frame 324 can be provided to a multiplexer 312.

FIG. 4D depicts an example video resolution reference frame 440 that can correspond to video resolution reference frame 324. In the illustrated example, the video resolution reference frame 440 is upscaled by a scaling factor M=4 in both the width (W) and height (H) dimensions. In the illustrated example, the video resolution previous frame 430 includes one sixteenth (1/16) the number of pixels in the video resolution reference frame 440. As illustrated, after upscaling, the reference frame can have a pixelated (e.g., degraded quality) appearance relative to the current frame N. In some implementations, the pixelated appearance of the reference frame does not affect the ability to recover the current frame N without loss, because the same reference frame can be used for both the formatting and reconstruction of the current frame N.

Returning to FIG. 3A, the multiplexer 312 can have a first input (labeled as 0) a second input, (labeled as "1") and a selector input. In the illustrated example, the video resolution reference frame 324 is provided to the first input 0 of the multiplexer 312. In the illustrated example, a null or empty frame 319, which can be a frame equal in dimensions to video resolution but with each pixel value equal to zero. As illustrated, the select input is coupled to a select signal 325. In one illustrative example, the select signal 325 can have a value of 1 if the current frame is the first frame captured in a sequence of frames by image capture device 302 and a value of 0 for any frame after the first frame captured in a sequence of frames. In some cases, a downscaled reference frame 341 may not be available for the first frame of a sequence of frames, and the null or empty frame 319 can be used as a reference so that the output of subtractor 317 can be valid. In the illustrative example, the output of subtractor 317 for the first frame in the sequence of frames can be the video resolution current frame 314. For each subsequent frame after the first frame, the difference frame 318 output from subtractor 317 can be the result of subtracting the video resolution reference frame 324 from video resolution current frame 314 on a pixel by pixel basis.

Figure 4E:
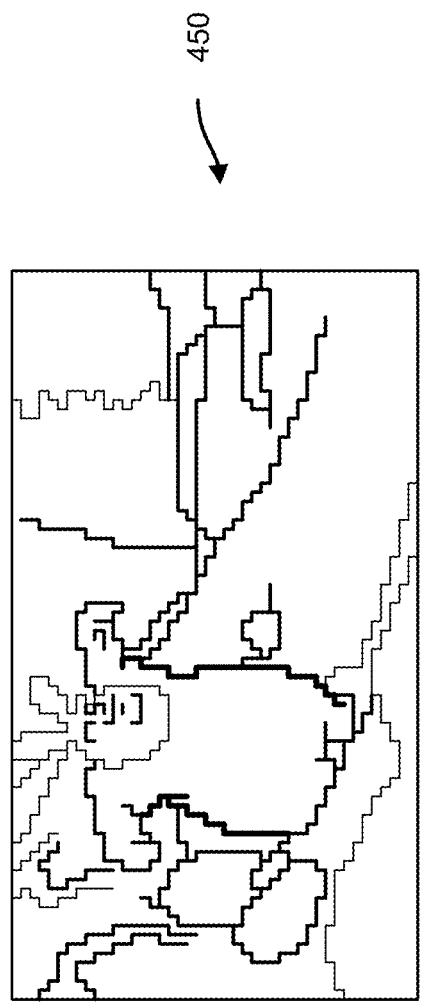

FIG. 4E depicts an example difference frame 450 that can correspond to difference frame 318 of FIG. 3A. As illustrated, some pixels of the difference frame 450 can include values indicative of no change in pixel value at a particular pixel position between the reference frame and the current frame indicated. In the illustrated example, values indicative of no change are indicated by white regions in the difference frame 450. As illustrated by difference frame 450, pixel positions with a difference between the reference frame and the current frame are illustrated with black lines. In the illustrated example, thickness of the black lines can indicate an amount of difference between the reference frame and the current frame at a given pixel position, with thicker lines indicating a greater difference. The example difference frame 450 is a simplified representation of a difference frame that includes a small portion of the overall frame with difference values (e.g., in pixel positions corresponding to the black lines). In some cases, more or fewer pixels of a difference frame 450 can include difference values without departing from the scope of the present disclosure.

Returning to FIG. 3A, in some implementations, the difference frame 318 can include a signed (e.g., including positive and negative values) representation of the difference between each pixel of video resolution current frame 314 and video resolution reference frame 324. In some cases, when the difference between pixels in the video resolution reference frame 324 and video resolution current frame 314 is small, the difference value can be represented by a small number of data bits with a small bit depth. In one illustrative example, the small number of data bits can include one sign bit and K magnitude bits. For example, for any pixel position where the value in difference frame 318 is between −7 and 7, the value can be represented with K=3 magnitude bits and one sign bit, with the remaining upper (e.g., most significant) J−K bits (e.g., 13 bits for J=16 and K=3) of the value at the respective pixel position in difference frame 318 being equal to zero. As used herein, the value of the remaining J−K most significant bits is also referred to as the remaining portion of the pixel value at the respective pixel position. In some cases, using the output formatter 320, the frame formatting section 304 can output a representation of the current frame N in a BW efficient format that does not transfer the upper J−K bits for pixel positions where the upper J−K bits have a value of zero. In some cases, the resulting reduction in data sent to storage device 306 can reduce the memory bandwidth required for storing and processing the sequence of frames including the current frame and the reference frame compared to storing the full sized frames at video resolution. In addition, the video resolution current frame 314 can be subsequently reconstructed without loss as described in more detail with respect to FIGS. 5A and 5B.

Figure 3B:
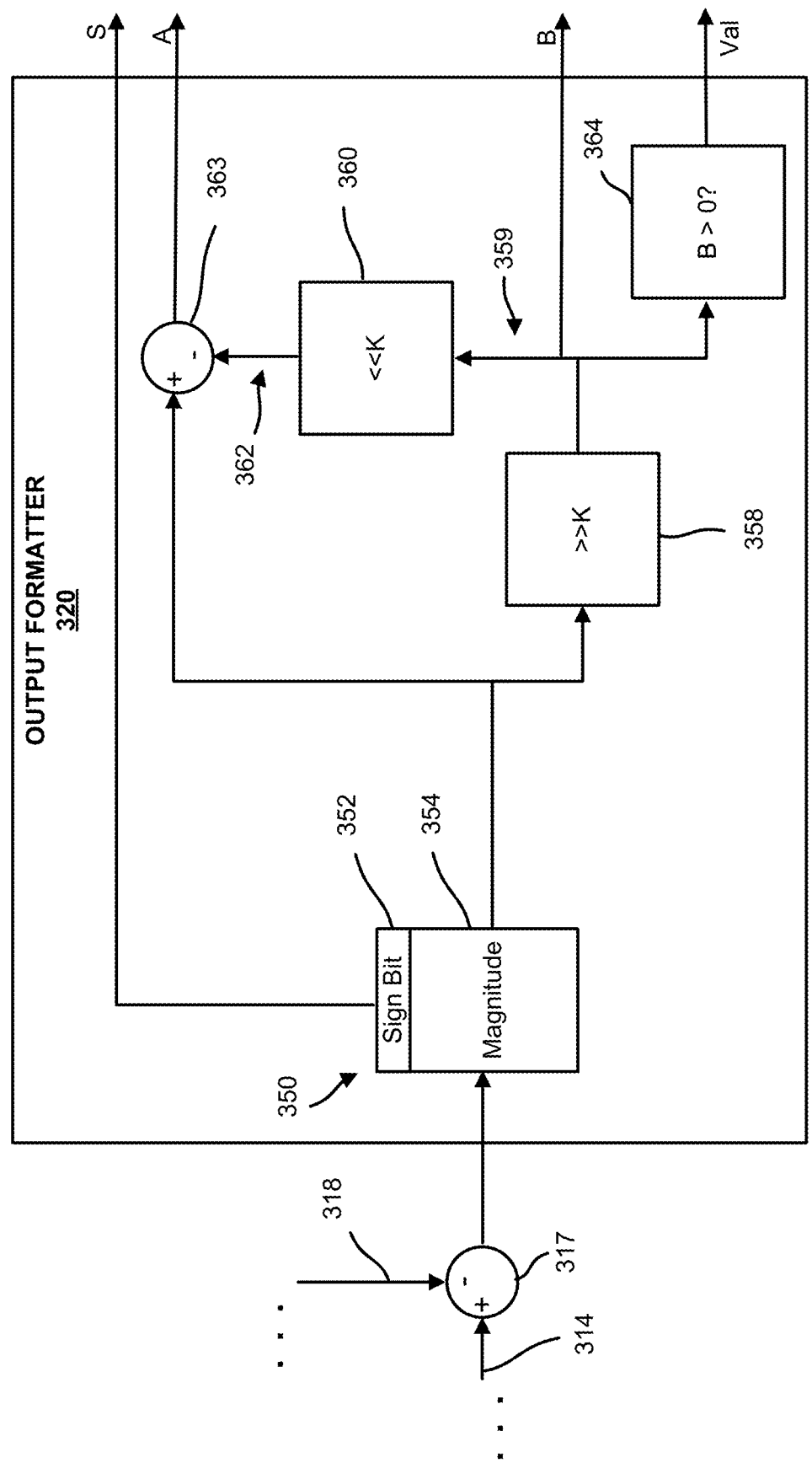
FIG. 3B is a block diagram illustrating an example output formatter of the frame formatting section of FIG. 3A, in accordance with some examples.

FIG. 3B illustrates an example block diagram of the output formatter 320 that can format the difference frame 318 into the BW efficient format. The illustration of FIG. 3B corresponds to the bounded region 321 of FIG. 3A. In the illustrated example, the output formatter 320 can operate on one pixel of the difference frame 318 at a time. As noted above, the output formatter 320 can obtain the difference frame 318 from the subtractor 317. A pixel value 350 for a pixel of the difference frame 318 is illustrated in FIG. 3B having a sign bit 352 and J magnitude bits. In one illustrative example, J can be equal to 16. In the illustrated example of FIG. 3B, the output formatter 320 can directly output the value of the sign bit 352 from the output formatter 320 as the sign bit S. In some cases, the magnitude 354 (including J bits) can be input to shift right by K bits block 358 and a subtractor 363. As used herein, shifting right can be understood to refer to shifting toward the least significant bit of the magnitude 354 (or any other binary value). In some cases, the shift right by K bits block 358 can shift the lower K bits out of the magnitude 354, leaving only the upper J−K bits in output 359. In some cases, the output 359 of the shift right by K bits block 358 can be output from output formatter 320 as second output value B.

In some examples, for pixels where the magnitude of the difference is small enough to be stored only in the lowest K bits of the J bits of magnitude 354, the output 359 can be equal to zero. In some cases, for pixels where the magnitude difference is greater than the value that can be stored in the lowest K bits of the J bits, the value of the output 359 can be non-zero. A comparison block 364 can determine whether the value of output 359 is zero or non-zero and generate a valid bit Val based on the comparison. In one illustrative example, the comparison block 364 can set the valid bit 337 equal to one (1) if the value of output 359 is non-zero and equal to zero (0) if the value of output 359 is equal to 0. In some cases, the comparison by comparison block 364 can also be used to determine whether the second output value B (e.g., the upper J−K bits of the magnitude 354) should be output from the output formatter 320. If the value of output 359 is zero, then the output formatter 320 can forego outputting the second output value B that contains only zeroes. In some cases, the value of K can be adjusted based on the differences between frames. For example, for a sequence of frames with fast moving objects (e.g., video of a sporting event, motor vehicle race, or the like) may utilize a larger value of K than a value of K used for a sequence of frames with slower moving objects (e.g., a video of a nature scene).

As illustrated, output 359 is also supplied to a shift left by K bits block 360. The shift left by K bits block 360 can shift the upper J−K bits of output 359 toward the left. As used herein, shifting left can be understood to refer to shifting toward the most significant bit of the output 359 (or any other binary value). The output of shift left by K bits block 360 is referred to as subtraction value 362 herein. In the illustrated example, by shifting the bits of output 359 to the left by K bits, the subtraction value 362 can include J−K most significant bits having the same value as the J−K most significant bits of magnitude 354. In some implementations, as part of the shift left by K bits block 360, the least significant K bits of the subtraction value 362 can be filled with zeroes. Subtractor 363 can subtract subtraction value 362 from magnitude 354 and the resulting first output value can include zeroes in the J−K most significant bits of magnitude 354. In some cases, the K least significant bits can be output from output formatter 320 as output A without including the J−K most significant bits.

Returning to FIG. 3A, the first output value A, sign bit S, second output value B, and valid bit Val from the output formatter 320 can be stored in storage device 306. In some cases, the output value A for multiple pixels of a frame can be stored in a single memory location within storage device 306. In one illustrative example with K=5 bits and the size of a memory location in the storage device 306 of 16 bits, the first output value A for three pixels can be stored within a single memory location. Collectively, the first output value A, sign bit S, second output value B, and valid bit Val, along with the downscaled reference frame 341, which is used to reconstruct the current frame N, are an illustrative example of a BW efficient format for storing frames. In some cases, storage device 306 can include or be included in storage device 206. In some examples, a processing component of a device including frame formatting section 304 and/or a second device that obtains the current frame in the BW efficient format can obtain the current frame in the BW efficient format from storage device 306 and the downscaled reference frame 341 from low latency storage 340 to reconstruct the current frame at the video resolution and perform further processing of the current frame. When the frames stored in storage device 306 are retrieved from memory, the sign bit S can be output from storage device 306 as sign bit 333, the first output value A can be output from storage device 306 as first output value 331, the second output value B can be output from storage device 306 as second output value 335, and the valid bit Val can be output from storage device 306 as valid bit 337.

In some cases, increasing the value of M can decrease the overhead associated with storing a reference frame needed to reconstruct the current frame after formatting by the output formatter 320. However, selecting a very large value of M can result in the reference frame after upscaling by upscaler 323 being so blurred that the difference value output by subtractor 317 can be larger than the magnitude that can be stored in the K least significant bits of the first output A of output formatter 320.

Returning to FIG. 2, in some cases, frame reconstruction section 208 can obtain a BW efficient formatted frame (e.g., formatted by frame formatting section 204) and a reference frame from storage device 206 to reconstruct the original the frame to the original video resolution without any loss.

Figure 5A:
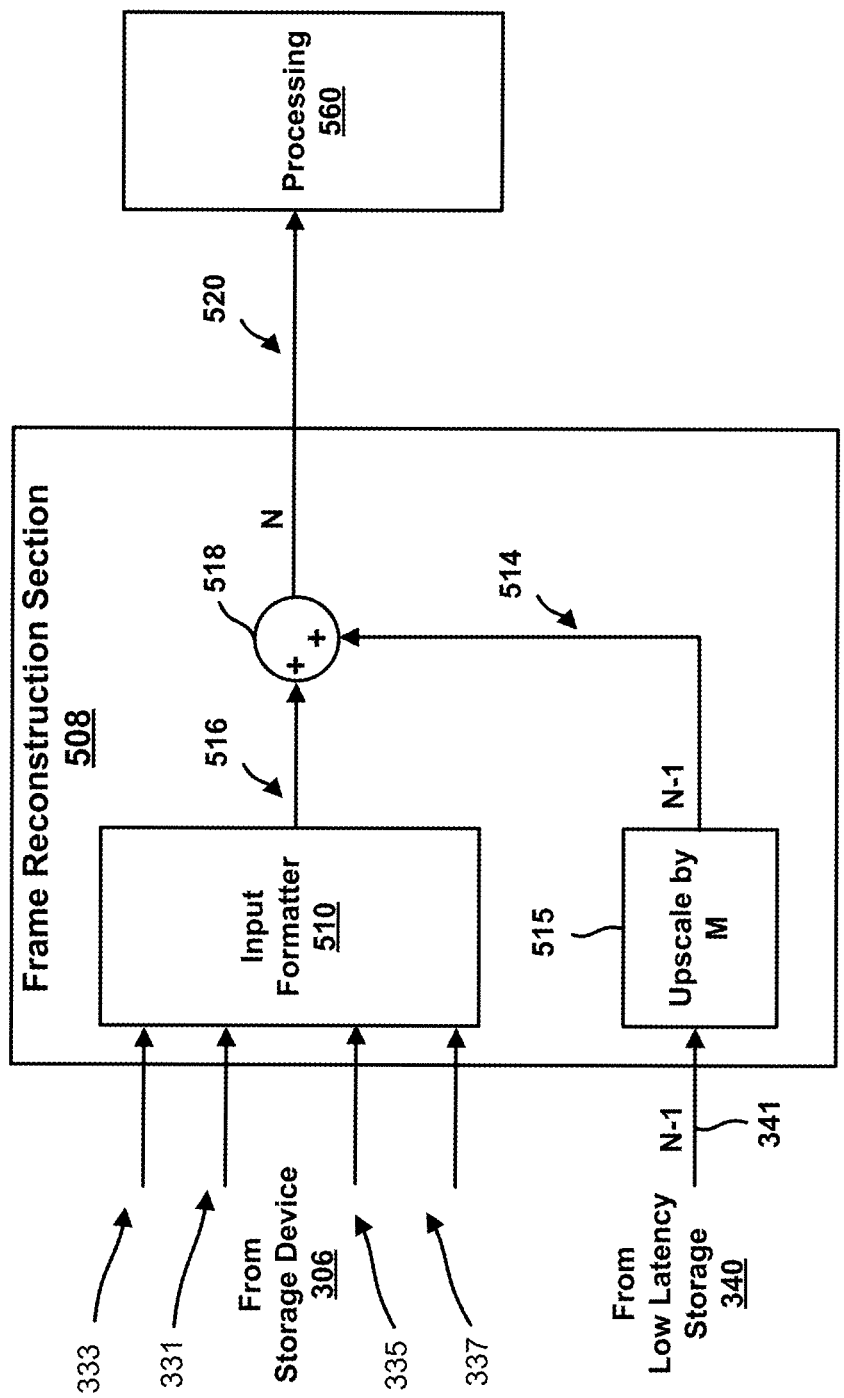
FIG. 5A is a block diagram illustrating an example frame reconstruction section of a BW efficient real time video processing system, in accordance with some examples.

Referring to FIG. 5A, an example frame reconstruction section 508 is depicted. In some cases, the frame reconstruction section 508 can correspond to the frame reconstruction section 208 of FIG. 2. In some cases, the frame reconstruction section 508 can be configured to reconstruct a selected frame from a sequence of frames (e.g., a target frame) using a BW efficient format representation of the target frame and a reference frame. In some implementations, the reference frame can be the frame immediately preceding the target frame in the sequence of frames.

In the illustrated example, frame reconstruction section 508 includes an input formatter 510, an upscaler 515, and an adder 518. As illustrated, the frame reconstruction section 508 can obtain first output value 331, sign bit 333, second output value 335, valid bit 337 as input from storage device 206 of FIG. 2, storage device 306 of FIG. 3A, or any other storage device. In some cases, frame reconstruction section 508 can obtain a downscaled reference frame 341 from storage device 206 of FIG. 2, low latency storage 340 of FIG. 3A, or any other suitable storage.

As illustrated, the input formatter 510 can reconstruct the difference value, output by subtractor 317 of FIG. 3A, from the BW efficient format representation of the target frame. In some cases, the reconstructed difference value 516 can be output to adder 518. The reconstructed difference value 516 can have a resolution equal to the video resolution of the original target frame after downscaling by downscaler 313 of FIG. 3A. In the illustrated example, downscaled reference frame 341 can be upscaled by the scaling factor M (e.g., the same scaling factor M applied by upscaler 323 and downscaler 315 of FIG. 3A) to upscale the downscaled reference frame 341 output as the video resolution reference frame 514. The video resolution reference frame 514 can be a second input to adder 518. The adder 518 can add video resolution reference frame 514 and reconstructed difference value 516 to reconstruct the original target frame at the video resolution without any loss. This can be accomplished because the same reference frame subtracted from the video resolution reference frame 324 output by subtractor 317 of FIG. 3A is added to reconstructed difference value 516, which is identical to the output of subtractor 317. The output of the adder 518 is referred to as reconstructed target frame 520. From the perspective of any downstream processing or storage such as processing section 560 of FIG. 5A, the reconstructed target frame 520 can be identical to the video resolution current frame 314 output by downscaler 313 of FIG. 3A.

Figure 5B:
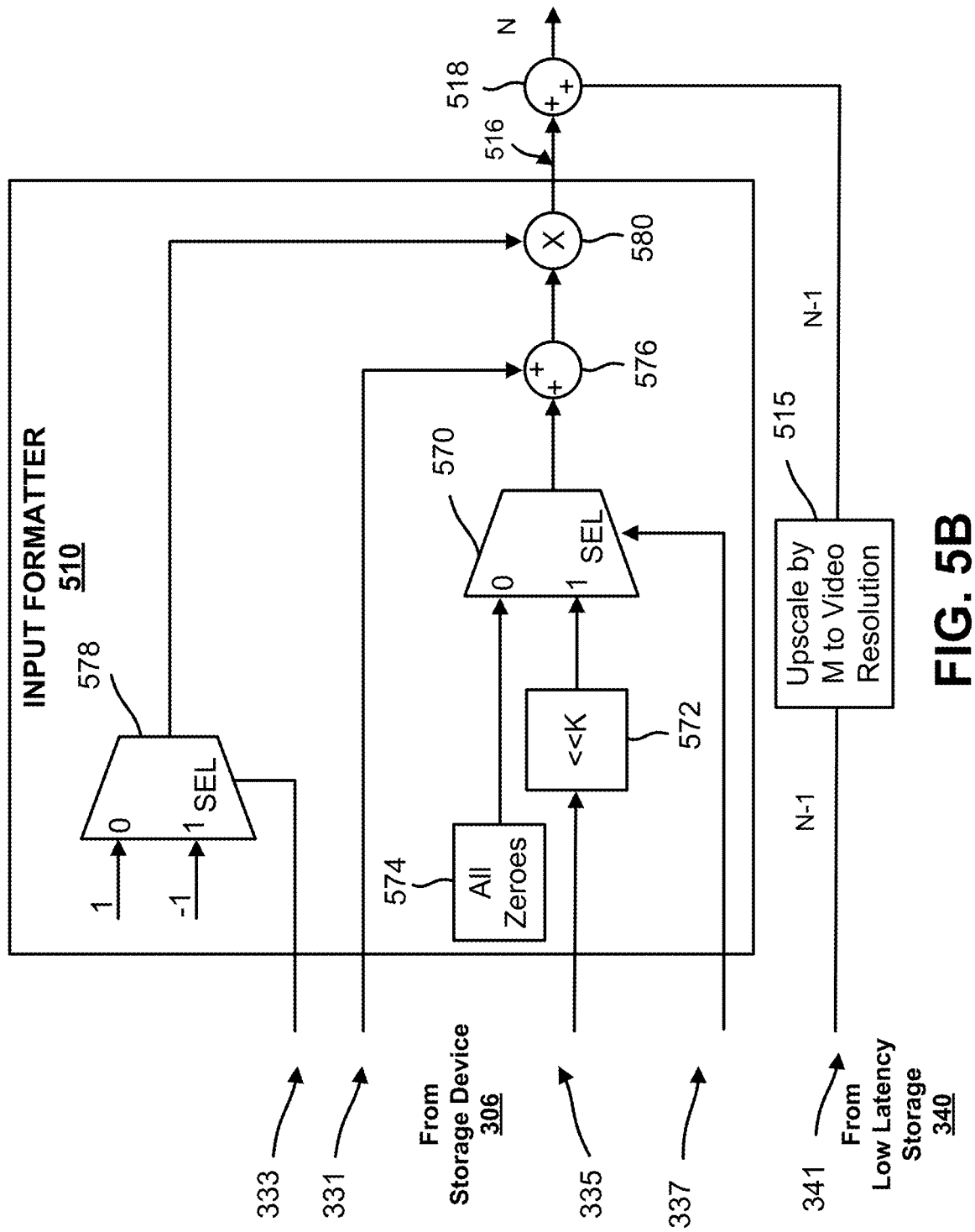
FIG. 5B is a block diagram illustrating an example input formatter of the frame reconstruction section of FIG. 5A, in accordance with some examples.

FIG. 5B illustrates an example block diagram of input formatter 510 that can be used to generate the reconstructed difference value 516 as described with respect to FIG. 5A. As illustrated, the sign bit 333 can be input into a select input of a first multiplexer 578. The first multiplexer 578 can be configured to output a value of 1 if the sign bit 333 is equal to zero and a value of −1 if the sign bit 333 is equal to 0. The output of the first multiplexer 578 can be provided to a first input of a multiplier 580. The first output value 331, which can include the K least significant bits of the magnitude of the reconstructed difference value 516 can be provided to a first input of adder 576. As shown, valid bit 337 can be input into a select input of a second multiplexer 570. In some examples, if the valid bit 337 has a value of zero, a null frame 574 can be output from the second multiplexer 570 to a second input of the adder 576. In some cases, if the valid bit 337 has a value of 1, the second output value 335 shifted to the left by K bits at the shift left by K bits block 572 can be output from the second multiplexer 570 to the second input of the adder 576. The sum output by adder 576 can be input to a second input of the multiplier 580 and reconstructed difference value 516 is the resulting output. Shifting the second output value 335 by K bits provides the J–K most significant bits of the magnitude of the reconstructed difference value 516. Accordingly, the output of adder 518 can include the J bits of the magnitude of the reconstructed difference value 516. In some cases, by multiplying the J bits of the magnitude of the reconstructed difference value 516 by the sign output by first multiplexer 578 can produce the reconstructed difference value 516.

Returning to FIG. 2, processing section 210 can obtain one or more reconstructed frames (e.g., reconstruction of a series of frames that includes the current frame and reference frame of FIGS. 3A and 3B and/or the target frame and reference frame of FIGS. 5A and 5B). In some cases, processing section 210 can perform downstream processing of the one or more reconstructed frames output from frame reconstruction section 208. In some cases, the processing section 210 can perform offline processing (e.g., not in real time as the frames are captured) of the series of frames captured by one or more image capture devices 202. In some cases, after the processing by processing section 210 is completed, the resulting output of processing section 210 can be formatted by a frame formatting section 204 before being stored in storage device 206.

Figure 6:
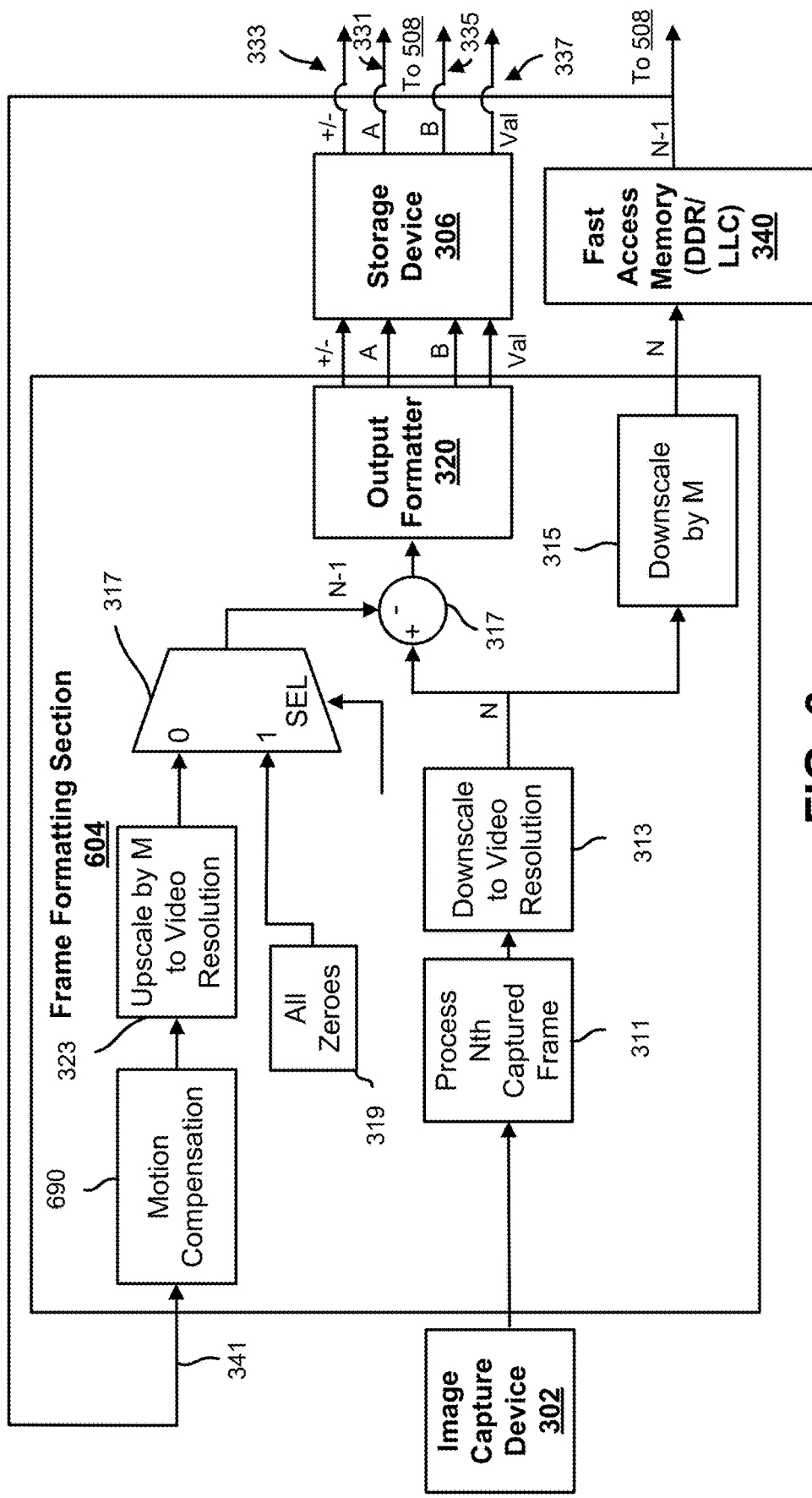
FIG. 6 is a block diagram illustrating an example BW efficient real time video processing system including a motion detection and compensation section, in accordance with some examples.

FIG. 6 is a block diagram illustrating an example frame formatting section 604 including a motion detection and compensation section 690. The frame formatting section 604 can include image processing at processing block 311, multiplexer 312, downscaler 313, downscaler 315, subtractor 317, upscaler 323, output formatter 320, storage device 306 and low latency storage 340, each of which can be similar to and perform similar functions as like numbered components of the frame formatting section 304 of FIG. 3A. As illustrated, motion detection and compensation section 690 is configured to obtain downscaled reference frame 341 from low latency storage 340. In some cases, motion detection and compensation section 690 can obtain motion information from one or more motion sensors, such as an accelerometer, gyroscope, or the like. For example, the image capture device 302 may include one or more motion sensors. In some cases, the motion detection and compensation section 690 can estimate an amount and/or direction of motion between the time the reference frame was captured and the time that raw current frame 305 was captured. In some cases, using the estimated amount and/or direction of motion, the motion detection and compensation section 690 can warp the downscaled reference frame 341 to compensate for the motion and align or rectify the images. In some cases, by performing the motion compensation at motion detection and compensation section 690, the difference calculated by subtractor 317 for each pixel can be minimized. In some examples, performing the motion compensation at motion detection and compensation section 690 can increase the number of pixels output by the output formatter 320 that include only the lower K bits (e.g., the first portion, A) in the BW efficient representation of the current frame output by output formatter 320.

In another example implementation (not shown) the motion detection and compensation section 690 can be included between the upscaler 323 and the multiplexer 312. In some implementations, the motion detection and compensation section 690 can warp the video resolution current frame 314 to align with the downscaled reference frame 341 rather than warping the downscaled reference frame 341 to align with the video resolution current frame 314.

As noted above, the BW efficient real time video processing system 200 and related techniques described herein can allow a system to reduce the memory bandwidth required to store and/or process consecutively captured frames from an image capture device. For instance, for a pair of consecutive frames that include a common region of the sky, the difference between pixel values at pixel locations that include the sky can experience small or no changes in pixel output value between consecutive frames. Using the systems and techniques described herein, a frame can be represented in a BW efficient format that, along with a downscaled reference frame, can reduce the total amount of data required to store and recover the frame.

Figure 7A:
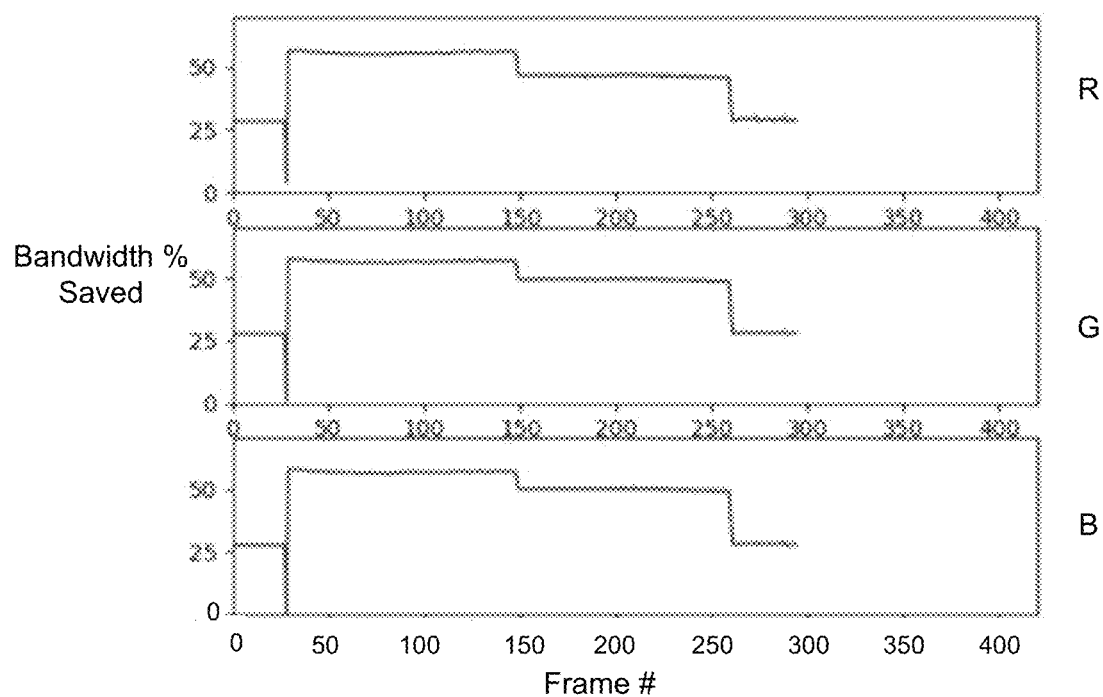
FIGS. 7A and 7B are plots illustrating bandwidth saving from experiments utilizing bandwidth efficient processing of frames, in accordance with some examples.
Figure 7B:
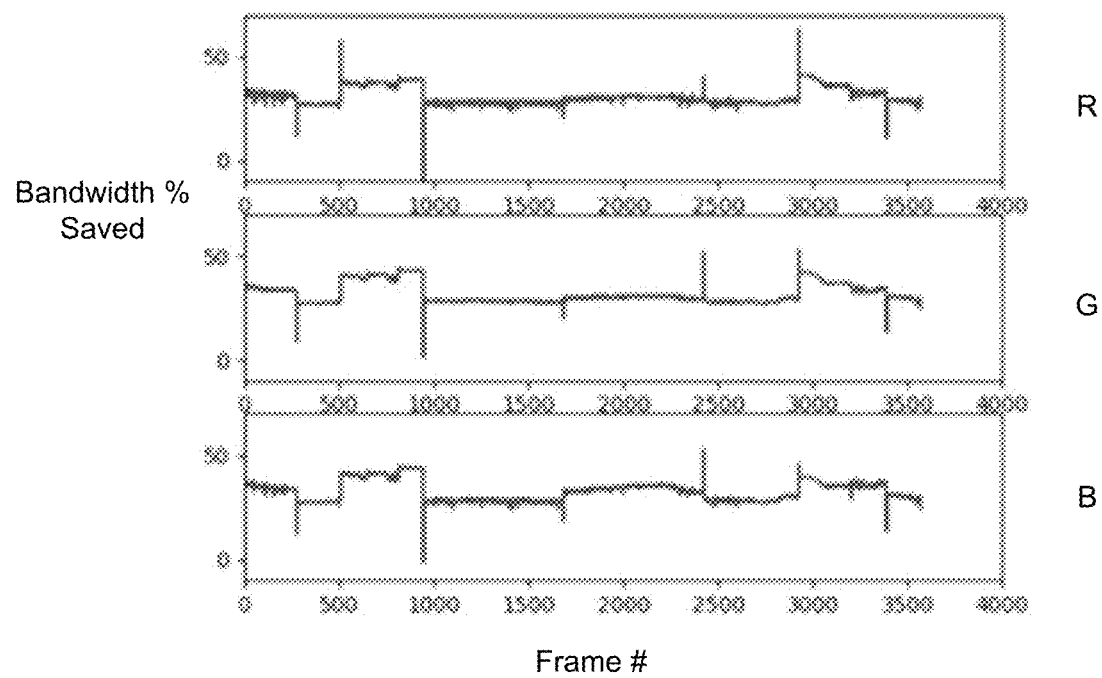

FIGS. 7A and 7B are plots illustrating bandwidth saving from experiments utilizing the bandwidth efficient processing of frames according to the systems and techniques described herein. FIG. 7A illustrates bandwidth savings for a first example sequence of approximately 300 frames (e.g., a video lasting 10 seconds if played at 30 frames per second) and FIG. 7B illustrates bandwidth savings a second example sequence of approximately 3600 frames (e.g., a video lasting two minutes if played at 30 frames per second) in FIG. 7B. Each of the FIGS. 7A and 7B contains three plots representing red, blue, and green color channels of pixel data in the frames a video. In each of the FIGS. 7A and 7B, the horizontal axes represent the frame number in the sequence of frames corresponding to frames processed using the systems and techniques described herein. In the illustrated example of FIG. 7A, the first sequence of frames included approximately The vertical axes represent a percentage bandwidth saving provided by encoding the frames according to the systems and techniques described herein. The bandwidth savings in the plots of FIGS. 7A and 7B were computed relative to processing the same sequences of frames without encoding the frames using the systems and techniques described herein. As illustrated, for some portions of the sequences of frames, a bandwidth improvement exceeding fifty percent (50%) can be achieved using the systems and techniques.

By reducing the amount of data required to store frames, the bandwidth requirements for system memory (e.g., LLC, DDR, etc.) can be reduced and/or higher resolutions and/or framerates can be supported with a given memory bandwidth. In addition, reducing the amount of data transferred to and from memory can reduce power consumption. Also, due to the lossless nature of the BW efficient format, the image quality of the frames does not need to be sacrificed to achieve the bandwidth and power consumption benefits provided by the systems and techniques described herein.

Figure 8:
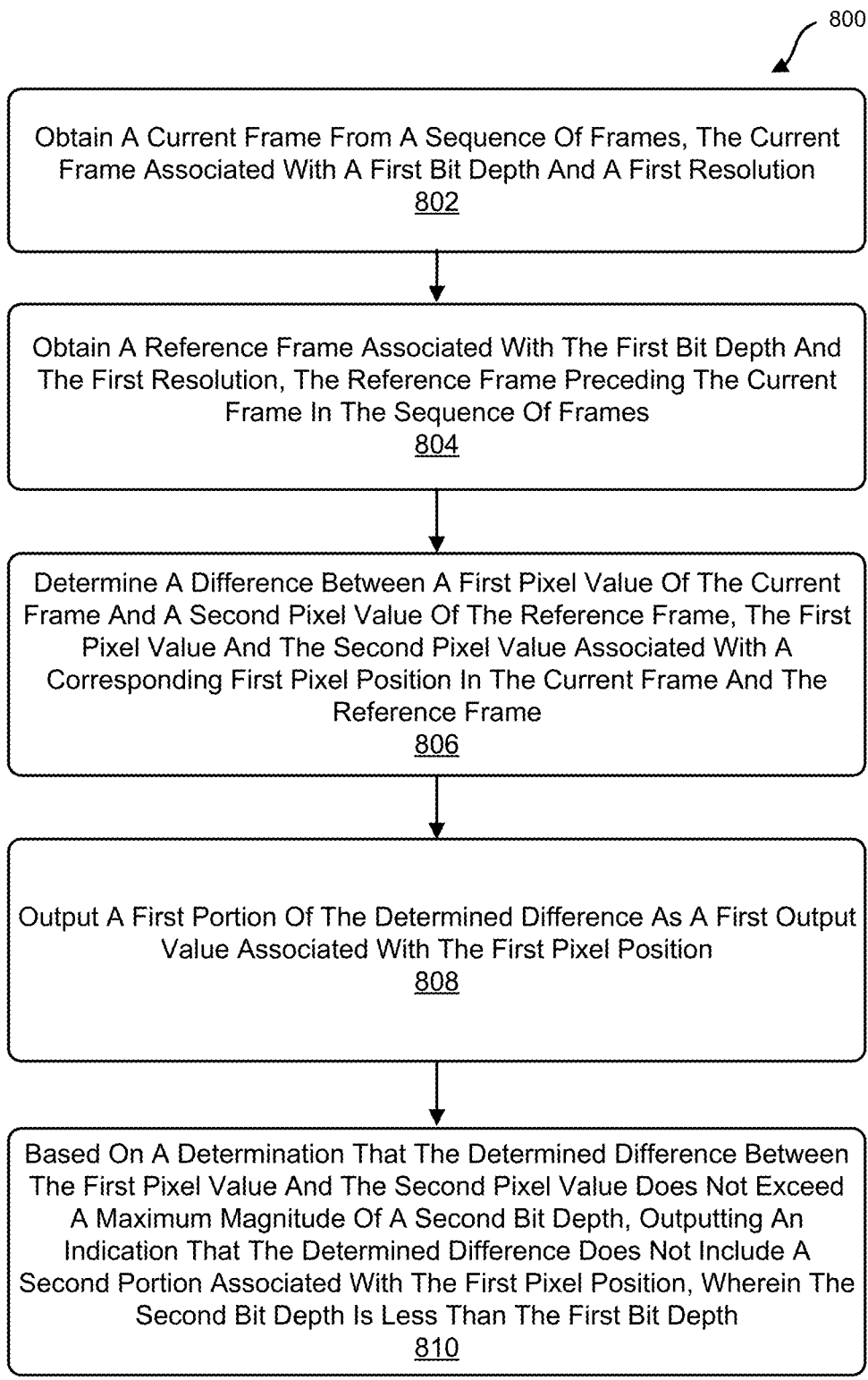
FIG. 8 is a flow diagram illustrating an example of a frame processing technique, in accordance with some examples.

FIG. 8 is a flow diagram illustrating an example of a process 800 implementing a frame processing technique, in accordance with some examples. At block 802, the process 800 includes obtaining a current frame from a sequence of frames. In some cases, the current frame is associated with a first bit depth and a first resolution.

At block 804, the process 800 includes obtaining a reference frame associated with the first bit depth and the first resolution. In some aspects, the reference frame precedes the current frame in the sequence of frames. In some implementations, obtaining the reference frame includes obtaining a downscaled previous frame associated with the first bit depth and a second resolution, the second resolution being less than the first resolution in at least one dimension and upscaling the downscaled previous frame from the second resolution to the first resolution to generate the reference frame.

At block 806, the process 800 includes determining a difference between a first pixel value of the current frame and a second pixel value of the reference frame. In some examples, the first pixel value and the second pixel value are associated with a corresponding first pixel position in the current frame and the reference frame. In some cases, the first portion of the determined difference includes a number of least significant bits of the determined difference. In some aspects, the number of least significant bits of the determined difference is equal to the second bit depth.

At block 808, the process 800 includes outputting a first portion of the determined difference as a first output value associated with the first pixel position. In some cases, the process 800 includes determining the first portion of the determined difference. In some examples, determining the first portion of the determined difference includes: shifting the determined difference represented in binary toward a least significant bit of the determined difference by a number of bits equal to the second bit depth to generate the second portion associated with the first pixel position, shifting the second portion toward a most significant bit of the second portion by the number of bits equal to the second bit depth to generate a subtraction value, and subtracting the subtraction value from the determined difference to generate the first portion of the determined difference. In some examples, the first portion includes a number of least significant bits equal to the second bit depth resulting from subtracting the subtraction value from the determined difference. In some cases, the first portion includes a number of least significant bits equal to the second bit depth resulting from subtracting the subtraction value from the determined difference.

At block 810, the process 800 includes, based on a determination that the determined difference between the first pixel value and the second pixel value does not exceed a maximum magnitude of a second bit depth, outputting an indication that the determined difference does not include a second portion associated with the first pixel position. In some cases, the second bit depth is less than the first bit depth. In some cases, the process 800 includes outputting a sign bit indicative of a sign of the first output value.

In some cases, the process 800 includes determining a difference between a third pixel value of the current frame and a fourth pixel value of the reference frame. In some examples, the third pixel value and the fourth pixel value are associated with a corresponding second pixel position in the current frame and the reference frame. In some examples, the process 800 includes outputting a first portion of the determined difference between the third pixel value and the second pixel value as a second output value associated with the second bit depth. In some cases, the second output value is associated with the second pixel position. In some examples, the process 800 includes, based on determining that the difference between the third pixel value and the fourth pixel value exceeds the maximum magnitude of the second bit depth; outputting an indication that the determined difference includes a second portion associated with the second pixel position and a third bit depth. In some examples, the process 800 includes: outputting the second portion associated with the second pixel position as a third output value. In some cases, the third output value corresponds to a remaining portion of the determined difference between the third pixel value and the fourth pixel value not included in the second output value. In some implementations, the third bit depth is a function of the first bit depth and the second bit depth. In some aspects, the third bit depth is equal to the first bit depth minus the second bit depth.

In some examples, a bandwidth efficient representation of the current frame includes the first output value associated with the first pixel position corresponding to the first portion of the determined difference between the first pixel value and the second pixel value, the second output value associated the second pixel position corresponding to the first portion of the determined difference between the third pixel value and the fourth pixel value, and the third output value associated with the second pixel position corresponding to the second portion of the determined difference between the third pixel value and the fourth pixel value. In some cases, the bandwidth efficient representation of the current frame does not include an output value associated with the first pixel position corresponding to the second portion of the determined difference between the first pixel value and the second pixel value.

FIG. 8 is a flow diagram illustrating an example of a process 800 implementing a frame processing technique, in accordance with some examples. At block 802, the process 800 includes obtaining a current frame from a sequence of frames. In some cases, the current frame is associated with a first bit depth and a first resolution.

The process 800 illustrated in FIG. 8 may also include any operation illustrated in, or discussed with respect to, the image capture and processing system 100, the image capture device 105A, the image processing device 105B, BW efficient real time video processing system 200, or a combination thereof. The frame processing technique of FIG. 8 may represent at least some of the operations of an image capture and processing system 100, an image capture device 105A, an image processing device 105B, BW efficient real time video processing system 200, a computing system 900, or a combination thereof.

In some cases, at least a subset of the techniques illustrated by the process 800 may be performed remotely by one or more network servers of a cloud service. In some examples, the processes described herein (e.g., process 800 and/or other process(es) described herein) may be performed by a computing device or apparatus. In some examples, the process 800 can be performed by the image capture device 105A of FIG. 1. In some examples, the process 800 can be performed by the image processing device 105B of FIG. 1. The process 800 can also be performed by the image capture and processing system 100 of FIG. 1. The process 800 can also be performed by the BW efficient real time video processing system 200 of FIG. 2. The process 800 can also be performed by a computing device with the architecture of the computing system 900 shown in FIG. 9. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by block diagrams in FIG. 1 (of image capture and processing system 100), FIG. 2 (of BW efficient real time video processing system 200), and FIG. 9 (of computing system 900) and the flow diagram illustrating process 800 are illustrative of, or organized as, logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams 100, 200, and 900 and the flow diagram illustrating process 800 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple R Lightning R port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick R card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic array's (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: A method of processing frames, the method comprising: obtaining a current frame from a sequence of frames, the current frame associated with a first bit depth and a first resolution; obtaining a reference frame associated with the first bit depth and the first resolution, the reference frame preceding the current frame in the sequence of frames; determining a difference between a first pixel value of the current frame and a second pixel value of the reference frame, the first pixel value and the second pixel value associated with a corresponding first pixel position in the current frame and the reference frame; outputting a first portion of the determined difference as a first output value associated with the first pixel position; and based on a determination that the determined difference between the first pixel value and the second pixel value does not exceed a maximum magnitude of a second bit depth, outputting an indication that the determined difference does not include a second portion associated with the first pixel position, wherein the second bit depth is less than the first bit depth.

Aspect 2: The method of Aspect 1, wherein the first portion of the determined difference comprises a number of least significant bits of the determined difference.

Aspect 3: The method of any of Aspects 1 to 2, wherein the number of least significant bits of the determined difference is equal to the second bit depth.

Aspect 4: The method of any of Aspects 1 to 3, further comprising: determining a difference between a third pixel value of the current frame and a fourth pixel value of the reference frame, wherein the third pixel value and the fourth pixel value are associated with a corresponding second pixel position in the current frame and the reference frame; outputting a first portion of the determined difference between the third pixel value and the second pixel value as a second output value associated with the second bit depth, the second output value associated with the second pixel position; and based on determining that the difference between the third pixel value and the fourth pixel value exceeds the maximum magnitude of the second bit depth; outputting an indication that the determined difference includes a second portion associated with the second pixel position and a third bit depth; and outputting the second portion associated with the second pixel position as a third output value, wherein the third output value corresponds to a remaining portion of the determined difference between the third pixel value and the fourth pixel value not included in the second output value.

Aspect 5: The method of any of Aspects 1 to 4, wherein the third bit depth is a function of the first bit depth and the second bit depth.

Aspect 6: The method of any of Aspects 1 to 5, wherein the third bit depth is equal to the first bit depth minus the second bit depth.

Aspect 7: The method of any of Aspects 1 to 6, wherein a bandwidth efficient representation of the current frame comprises: the first output value associated with the first pixel position corresponding to the first portion of the determined difference between the first pixel value and the second pixel value; the second output value associated the second pixel position corresponding to the first portion of the determined difference between the third pixel value and the fourth pixel value; and the third output value associated with the second pixel position corresponding to the second portion of the determined difference between the third pixel value and the fourth pixel value.

Aspect 8: The method of any of Aspects 1 to 7, wherein the bandwidth efficient representation of the current frame does not include an output value associated with the first pixel position corresponding to the second portion of the determined difference between the first pixel value and the second pixel value.

Aspect 9: The method of any of Aspects 1 to 8, wherein obtaining the reference frame comprises: obtaining a downscaled previous frame associated with the first bit depth and a second resolution, the second resolution being less than the first resolution in at least one dimension; and upscaling the downscaled previous frame from the second resolution to the first resolution to generate the reference frame.

Aspect 10: The method of any of Aspects 1 to 9, further comprising outputting a sign bit indicative of a sign of the first output value.

Aspect 11: The method of any of Aspects 1 to 10, further comprising determining the first portion of the determined difference, wherein determining the first portion of the determined difference comprises: shifting the determined difference represented in binary toward a least significant bit of the determined difference by a number of bits equal to the second bit depth to generate the second portion associated with the first pixel position; shifting the second portion toward a most significant bit of the second portion by the number of bits equal to the second bit depth to generate a subtraction value; and subtracting the subtraction value from the determined difference to generate the first portion of the determined difference.

Aspect 12: The method of any of Aspects 1 to 11, wherein the first portion comprises a number of least significant bits equal to the second bit depth resulting from subtracting the subtraction value from the determined difference.

Aspect 13: A method of processing frames, the method comprising: obtaining a bandwidth efficient representation of a target frame associated with a first resolution and a first bit depth, wherein: the bandwidth efficient representation of the target frame includes pixel data for a plurality of pixel positions of the target frame; the pixel data includes a first portion of pixel data for every pixel position of the plurality of pixel positions and a second portion of pixel data for a subset of the plurality of pixel positions; the subset of the plurality of pixel positions excludes one or more bandwidth efficient pixel positions of the plurality of pixel positions; and the bandwidth efficient representation includes an indication that each pixel position of the subset of the plurality of pixel positions includes a second portion of pixel and that the one or more bandwidth efficient pixel positions do not include a second portion of pixel data; obtaining a reference frame associated with the bandwidth efficient representation of the target frame, the first resolution and the first bit depth; and generating a first reconstructed pixel based on a first pixel value of the reference frame and a first portion of the bandwidth efficient representation of the target frame associated with the first pixel position, wherein the one or more bandwidth efficient pixel positions comprises the first pixel position.

Aspect 14: The method of Aspect 13, further comprising: generating a second reconstructed pixel based on combining a second pixel value of the reference frame and a first pixel portion of the bandwidth efficient representation of the target frame, the first pixel value of the reference frame and the first pixel value of the bandwidth efficient representation of the target frame associated with a first pixel position of the plurality of pixel positions in the reference frame and the bandwidth efficient representation of the target frame, respectively, wherein the one or more bandwidth efficient pixel positions comprises the first pixel position.

Aspect 15: The method of any of Aspects 13 to 14, wherein obtaining the reference frame associated with the bandwidth efficient representation of the target frame, the first resolution and the first bit depth comprises obtaining a downscaled reference frame associated with the target frame, the first bit depth, and a second resolution different less than the first resolution and upscaling the downscaled reference frame from the second resolution to the first resolution to generate the reference frame.

Aspect 16: The method of any of Aspects 13 to 15, wherein the reference frame precedes the target frame in a sequence of frames.

Aspect 17: An apparatus for processing frames, comprising: a memory; and one or more processors coupled to the memory and configured to: obtain a current frame from a sequence of frames, the current frame associated with a first bit depth and a first resolution, obtain a reference frame associated with the first bit depth and the first resolution, the reference frame preceding the current frame in the sequence of frames, determine a difference between a first pixel value of the current frame and a second pixel value of the reference frame, the first pixel value and the second pixel value associated with a corresponding first pixel position in the current frame and the reference frame, output a first portion of the determined difference as a first output value associated with the first pixel position, and based on a determination that the determined difference between the first pixel value and the second pixel value does not exceed a maximum magnitude of a second bit depth, output an indication that the determined difference does not include a second portion associated with the first pixel position, wherein the second bit depth is less than the first bit depth.

Aspect 18: The apparatus of Aspect 17, the first portion of the determined difference comprises a number of least significant bits of the determined difference.

Aspect 19: The apparatus of any of Aspects 17 to 18, wherein the number of least significant bits of the determined difference is equal to the second bit depth.

Aspect 20: The apparatus of any of Aspects 17 to 19, wherein the one or more processors are configured to: determine a difference between a third pixel value of the current frame and a fourth pixel value of the reference frame, wherein the third pixel value and the fourth pixel value are associated with a corresponding second pixel position in the current frame and the reference frame; output a first portion of the determined difference between the third pixel value and the second pixel value as a second output value associated with the second bit depth, the second output value associated with the second pixel position; and based on determining that the difference between the third pixel value and the fourth pixel value exceeds the maximum magnitude of the second bit depth; output an indication that the determined difference includes a second portion associated with the second pixel position and a third bit depth; and output the second portion associated with the second pixel position as a third output value, wherein the third output value corresponds to a remaining portion of the determined difference between the third pixel value and the fourth pixel value not included in the second output value.

Aspect 21: The apparatus of any of Aspects 17 to 20, wherein the third bit depth is a function of the first bit depth and the second bit depth.

Aspect 22: The apparatus of any of Aspects 17 to 21, wherein the third bit depth is equal to the first bit depth minus the second bit depth.

Aspect 23: The apparatus of any of Aspects 17 to 22, wherein a bandwidth efficient representation of the current frame comprises: the first output value associated with the first pixel position corresponding to the first portion of the determined difference between the first pixel value and the second pixel value; the second output value associated the second pixel position corresponding to the first portion of the determined difference between the third pixel value and the fourth pixel value; and the third output value associated with the second pixel position corresponding to the second portion of the determined difference between the third pixel value and the fourth pixel value.

Aspect 24: The apparatus of any of Aspects 17 to 23, wherein the bandwidth efficient representation of the current frame does not include an output value associated with the first pixel position corresponding to the second portion of the determined difference between the first pixel value and the second pixel value.

Aspect 25: The apparatus of any of Aspects 17 to 24, wherein, to obtain the reference frame, the one or more processors are configured to: obtain a downscaled previous frame associated with the first bit depth and a second resolution, the second resolution being less than the first resolution in at least one dimension; and upscale the downscaled previous frame from the second resolution to the first resolution to generate the reference frame.

Aspect 26: The apparatus of any of Aspects 17 to 25, wherein the one or more processors are configured to output a sign bit indicative of a sign of the first output value.

Aspect 27: The apparatus of any of Aspects 17 to 26, wherein the one or more processors are configured to: shift the determined difference represented in binary toward a least significant bit of the determined difference by a number of bits equal to the second bit depth to generate the second portion associated with the first pixel position; shift the second portion toward a most significant bit of the second portion by the number of bits equal to the second bit depth to generate a subtraction value; and subtract the subtraction value from the determined difference to generate the first portion of the determined difference.

Aspect 28: The apparatus of any of Aspects 17 to 27, wherein the first portion comprises a number of least significant bits equal to the second bit depth resulting from subtracting the subtraction value from the determined difference.

Aspect 29: An apparatus for processing frames, comprising: a memory; and one or more processors coupled to the memory and configured to: obtain a bandwidth efficient representation of a target frame associated with a first resolution and a first bit depth, the bandwidth efficient representation of the target frame includes pixel data for a plurality of pixel positions of the target frame, the pixel data includes a first portion of pixel data for every pixel position of the plurality of pixel positions and a second portion of pixel data for a subset of the plurality of pixel positions, the subset of the plurality of pixel positions excludes one or more bandwidth efficient pixel positions of the plurality of pixel positions, the bandwidth efficient representation includes an indication that each pixel position of the subset of the plurality of pixel positions includes a second portion of pixel and that the one or more bandwidth efficient pixel positions do not include a second portion of pixel data, obtain a reference frame associated with the bandwidth efficient representation of the target frame, the first resolution and the first bit depth, and generate a first reconstructed pixel based on a first pixel value of the reference frame and a first portion of the bandwidth efficient representation of the target frame associated with the first pixel position, wherein the one or more bandwidth efficient pixel positions comprises the first pixel position.

Aspect 30: The apparatus of Aspect 29, wherein the one or more processors are configured to: generate a second reconstructed pixel based on combining a second pixel value of the reference frame and a first pixel portion of the bandwidth efficient representation of the target frame, the first pixel value of the reference frame and the first pixel value of the bandwidth efficient representation of the target frame associated with a first pixel position of the plurality of pixel positions in the reference frame and the bandwidth efficient representation of the target frame, respectively, wherein the one or more bandwidth efficient pixel positions comprises the first pixel position.

Aspect 31: The apparatus of any of Aspects 29 to 30, wherein obtaining the reference frame associated with the bandwidth efficient representation of the target frame, the first resolution and the first bit depth comprises obtaining a downscaled reference frame associated with the target frame, the first bit depth, and a second resolution different less than the first resolution and upscaling the downscaled reference frame from the second resolution to the first resolution to generate the reference frame.

Aspect 32: The apparatus of any of Aspects 29 to 31, wherein the reference frame precedes the target frame in a sequence of frames.

Aspect 33: A non-transitory computer-readable storage medium having stored thereon instructions which, when executed by one or more processors, cause the one or more processors to perform any of the operations of aspects 1 to 32.

Aspect 34: An apparatus comprising means for performing any of the operations of aspects 1 to 32.

Aspect 35: A method comprising operations according to any of Aspects 1-12 and any of Aspects 13-16.

Aspect 36: An apparatus for processing frames. The apparatus includes a memory (e.g., implemented in circuitry) configured to store one or more frames and one or more processors (e.g., one processor or multiple processors) coupled to the memory. The one or more processors are configured to perform operations according to any of Aspects 17 to 28 and any of Aspects 29 to 32.

Aspect 37: A computer-readable storage medium storing instructions that, when executed by one or more processors, cause the one or more processors to perform operations according to any of Aspects 1 to 12 and any of Aspects 13 to 16.

Aspect 38: An apparatus comprising means for performing operations according to any of Aspects 17 to 28 and any of Aspects 29 to 32.

What is claimed is:

1. A method of processing frames, the method comprising:
    obtaining a current frame from a sequence of frames, the current frame associated with a first bit depth and a first resolution;
    obtaining a reference frame associated with the first bit depth and the first resolution, the reference frame preceding the current frame in the sequence of frames;
    determining a difference between a first pixel value of the current frame and a second pixel value of the reference frame, the first pixel value and the second pixel value associated with a corresponding first pixel position in the current frame and the reference frame;
    outputting a first portion of the determined difference as a first output value associated with the first pixel position; and
    based on a determination that the determined difference between the first pixel value and the second pixel value does not exceed a maximum magnitude of a second bit depth, outputting an indication that the determined difference does not include a second portion associated with the first pixel position, wherein the second bit depth is less than the first bit depth.

2. The method of claim 1, wherein the first portion of the determined difference comprises a number of least significant bits of the determined difference.

3. The method of claim 2, wherein the number of least significant bits of the determined difference is equal to the second bit depth.

4. The method of claim 1, further comprising:
    determining a difference between a third pixel value of the current frame and a fourth pixel value of the reference frame, wherein the third pixel value and the fourth pixel value are associated with a corresponding second pixel position in the current frame and the reference frame;
    outputting a first portion of the determined difference between the third pixel value and the second pixel value as a second output value associated with the second bit depth, the second output value associated with the second pixel position; and
    based on determining that the difference between the third pixel value and the fourth pixel value exceeds the maximum magnitude of the second bit depth;
    outputting an indication that the determined difference includes a second portion associated with the second pixel position and a third bit depth; and
    outputting the second portion associated with the second pixel position as a third output value, wherein the third output value corresponds to a remaining portion of the determined difference between the third pixel value and the fourth pixel value not included in the second output value.

5. The method of claim 4, wherein the third bit depth is a function of the first bit depth and the second bit depth.

6. The method of claim 5, wherein the third bit depth is equal to the first bit depth minus the second bit depth.

7. The method of claim 4, wherein a bandwidth efficient representation of the current frame comprises:
- the first output value associated with the first pixel position corresponding to the first portion of the determined difference between the first pixel value and the second pixel value;
- the second output value associated the second pixel position corresponding to the first portion of the determined difference between the third pixel value and the fourth pixel value; and
- the third output value associated with the second pixel position corresponding to the second portion of the determined difference between the third pixel value and the fourth pixel value.

8. The method of claim 7, wherein the bandwidth efficient representation of the current frame does not include an output value associated with the first pixel position corresponding to the second portion of the determined difference between the first pixel value and the second pixel value.

9. The method of claim 1, wherein obtaining the reference frame comprises:
- obtaining a downscaled previous frame associated with the first bit depth and a second resolution, the second resolution being less than the first resolution in at least one dimension; and
- upscaling the downscaled previous frame from the second resolution to the first resolution to generate the reference frame.

10. The method of claim 1, further comprising outputting a sign bit indicative of a sign of the first output value.

11. The method of claim 1, further comprising determining the first portion of the determined difference, wherein determining the first portion of the determined difference comprises:
- shifting the determined difference represented in binary toward a least significant bit of the determined difference by a number of bits equal to the second bit depth to generate the second portion associated with the first pixel position;
- shifting the second portion toward a most significant bit of the second portion by the number of bits equal to the second bit depth to generate a subtraction value; and
- subtracting the subtraction value from the determined difference to generate the first portion of the determined difference.

12. The method of claim 11, wherein the first portion comprises a number of least significant bits equal to the second bit depth resulting from subtracting the subtraction value from the determined difference.

13. A method of processing frames, the method comprising:
- obtaining a bandwidth efficient representation of a target frame associated with a first resolution and a first bit depth, wherein:
  - the bandwidth efficient representation of the target frame includes pixel data for a plurality of pixel positions of the target frame;
  - the pixel data includes a first portion of pixel data for every pixel position of the plurality of pixel positions and a second portion of pixel data for a subset of the plurality of pixel positions;
  - the subset of the plurality of pixel positions excludes one or more bandwidth efficient pixel positions of the plurality of pixel positions; and
  - the bandwidth efficient representation includes an indication that each pixel position of the subset of the plurality of pixel positions includes a second portion of pixel and that the one or more bandwidth efficient pixel positions do not include a second portion of pixel data;
- obtaining a reference frame associated with the bandwidth efficient representation of the target frame, the first resolution and the first bit depth; and
- generating a first reconstructed pixel based on a first pixel value of the reference frame and a first portion of the bandwidth efficient representation of the target frame associated with the first pixel position, wherein the one or more bandwidth efficient pixel positions comprises the first pixel position.

14. The method of claim 13, further comprising:
- generating a second reconstructed pixel based on combining a second pixel value of the reference frame and a first pixel portion of the bandwidth efficient representation of the target frame, the first pixel value of the reference frame and the first pixel value of the bandwidth efficient representation of the target frame associated with a first pixel position of the plurality of pixel positions in the reference frame and the bandwidth efficient representation of the target frame, respectively, wherein the one or more bandwidth efficient pixel positions comprises the first pixel position.

15. The method of claim 13, wherein:
- obtaining the reference frame associated with the bandwidth efficient representation of the target frame, the first resolution and the first bit depth comprises obtaining a downscaled reference frame associated with the target frame, the first bit depth, and a second resolution different less than the first resolution; and
- upscaling the downscaled reference frame from the second resolution to the first resolution to generate the reference frame.

16. An apparatus for processing frames, comprising:
a memory; and
one or more processors coupled to the memory and configured to:
- obtain a current frame from a sequence of frames, the current frame associated with a first bit depth and a first resolution;
- obtain a reference frame associated with the first bit depth and the first resolution, the reference frame preceding the current frame in the sequence of frames;
- determine a difference between a first pixel value of the current frame and a second pixel value of the reference frame, the first pixel value and the second pixel value associated with a corresponding first pixel position in the current frame and the reference frame;
- output a first portion of the determined difference as a first output value associated with the first pixel position; and
- based on a determination that the determined difference between the first pixel value and the second pixel value does not exceed a maximum magnitude of a second bit depth, output an indication that the determined difference does not include a second portion associated with the first pixel position, wherein the second bit depth is less than the first bit depth.

17. The apparatus of claim 16, wherein the first portion of the determined difference comprises a number of least significant bits of the determined difference.

18. The apparatus of claim 17, wherein the number of least significant bits of the determined difference is equal to the second bit depth.

19. The apparatus of claim 16, wherein the one or more processors are configured to:
- determine a difference between a third pixel value of the current frame and a fourth pixel value of the reference frame, wherein the third pixel value and the fourth pixel value are associated with a corresponding second pixel position in the current frame and the reference frame;
- output a first portion of the determined difference between the third pixel value and the second pixel value as a second output value associated with the second bit depth, the second output value associated with the second pixel position; and
- based on determining that the difference between the third pixel value and the fourth pixel value exceeds the maximum magnitude of the second bit depth;
- output an indication that the determined difference includes a second portion associated with the second pixel position and a third bit depth; and
- output the second portion associated with the second pixel position as a third output value, wherein the third output value corresponds to a remaining portion of the determined difference between the third pixel value and the fourth pixel value not included in the second output value.

20. The apparatus of claim 19, wherein the third bit depth is a function of the first bit depth and the second bit depth.

21. The apparatus of claim 20, wherein the third bit depth is equal to the first bit depth minus the second bit depth.

22. The apparatus of claim 19, wherein a bandwidth efficient representation of the current frame comprises:
- the first output value associated with the first pixel position corresponding to the first portion of the determined difference between the first pixel value and the second pixel value;
- the second output value associated the second pixel position corresponding to the first portion of the determined difference between the third pixel value and the fourth pixel value; and
- the third output value associated with the second pixel position corresponding to the second portion of the determined difference between the third pixel value and the fourth pixel value.

23. The apparatus of claim 22, wherein the bandwidth efficient representation of the current frame does not include an output value associated with the first pixel position corresponding to the second portion of the determined difference between the first pixel value and the second pixel value.

24. The apparatus of claim 16, wherein, to obtain the reference frame, the one or more processors are configured to:
- obtain a downscaled previous frame associated with the first bit depth and a second resolution, the second resolution being less than the first resolution in at least one dimension; and
- upscale the downscaled previous frame from the second resolution to the first resolution to generate the reference frame.

25. The apparatus of claim 16, wherein the one or more processors are configured to output a sign bit indicative of a sign of the first output value.

26. The apparatus of claim 16, wherein the one or more processors are configured to:
- shift the determined difference represented in binary toward a least significant bit of the determined difference by a number of bits equal to the second bit depth to generate the second portion associated with the first pixel position;
- shift the second portion toward a most significant bit of the second portion by the number of bits equal to the second bit depth to generate a subtraction value; and
- subtract the subtraction value from the determined difference to generate the first portion of the determined difference.

27. The apparatus of claim 26, wherein the first portion comprises a number of least significant bits equal to the second bit depth resulting from subtracting the subtraction value from the determined difference.

28. An apparatus for processing frames, comprising:
- a memory; and
- one or more processors coupled to the memory and configured to:
  - obtain a bandwidth efficient representation of a target frame associated with a first resolution and a first bit depth, wherein:
    - the bandwidth efficient representation of the target frame includes pixel data for a plurality of pixel positions of the target frame;
    - the pixel data includes a first portion of pixel data for every pixel position of the plurality of pixel positions and a second portion of pixel data for a subset of the plurality of pixel positions;
    - the subset of the plurality of pixel positions excludes one or more bandwidth efficient pixel positions of the plurality of pixel positions;
    - the bandwidth efficient representation includes an indication that each pixel position of the subset of the plurality of pixel positions includes a second portion of pixel and that the one or more bandwidth efficient pixel positions do not include a second portion of pixel data;
  - obtain a reference frame associated with the bandwidth efficient representation of the target frame, the first resolution and the first bit depth; and
  - generate a first reconstructed pixel based on a first pixel value of the reference frame and a first portion of the bandwidth efficient representation of the target frame associated with the first pixel position, wherein the one or more bandwidth efficient pixel positions comprises the first pixel position.

29. The apparatus of claim 28, wherein the one or more processors are configured to:
- generate a second reconstructed pixel based on combining a second pixel value of the reference frame and a first pixel portion of the bandwidth efficient representation of the target frame, the first pixel value of the reference frame and the first pixel value of the bandwidth efficient representation of the target frame associated with a first pixel position of the plurality of pixel positions in the reference frame and the bandwidth efficient representation of the target frame, respectively, wherein the one or more bandwidth efficient pixel positions comprises the first pixel position.

30. The apparatus of claim 28, wherein obtaining the reference frame associated with the bandwidth efficient representation of the target frame, the first resolution and the first bit depth comprises obtaining a downscaled reference frame associated with the target frame, the first bit depth, and a second resolution different less than the first resolution and upscaling the downscaled reference frame from the second resolution to the first resolution to generate the reference frame.

* * * * *